Nov. 29, 1960　　　G. F. ABBOTT, JR　　　2,962,555
LINE CONCENTRATOR SYSTEM

Filed Dec. 31, 1957　　　　　　　　　　　　13 Sheets-Sheet 2

FIG. 14

| LINES | VG | TRUNKS |
|---|---|---|
| 00 - 04 | 0 | 0, 1, 2, 3, 8, 9 |
| 05 - 09 | 1 | 0, 1, 6, 7, 8, 9 |
| 10 - 14 | 2 | 2, 3, 4, 5, 8, 9 |
| 15 - 19 | 3 | 0, 1, 2, 4, 8, 9 |
| 20 - 24 | 4 | 4, 5, 6, 7, 8, 9 |
| 25 - 29 | 5 | 0, 1, 4, 5, 8, 9 |
| 30 - 34 | 6 | 3, 4, 5, 7, 8, 9 |
| 35 - 39 | 7 | 2, 5, 6, 7, 8, 9 |
| 40 - 44 | 8 | 2, 3, 6, 7, 8, 9 |
| 45 - 49 | 9 | 0, 2, 3, 6, 8, 9 |

FIG. 2

| FIG. 3 | FIG. 5 | FIG. 8 | FIG. 11 |
|---|---|---|---|
| FIG. 4 | FIG. 6 | FIG. 9 | FIG. 12 |
|  | FIG. 7 | FIG. 10 |  |

INVENTOR
G. F. ABBOTT, JR.
BY
Harold C. Herman
ATTORNEY

INVENTOR
G. F. ABBOTT, JR.
BY
Harold C. Herman
ATTORNEY

Nov. 29, 1960

G. F. ABBOTT, JR 2,962,555

LINE CONCENTRATOR SYSTEM

Filed Dec. 31, 1957

INVENTOR
G.F. ABBOTT, JR.
BY
Harold C. Herman
ATTORNEY

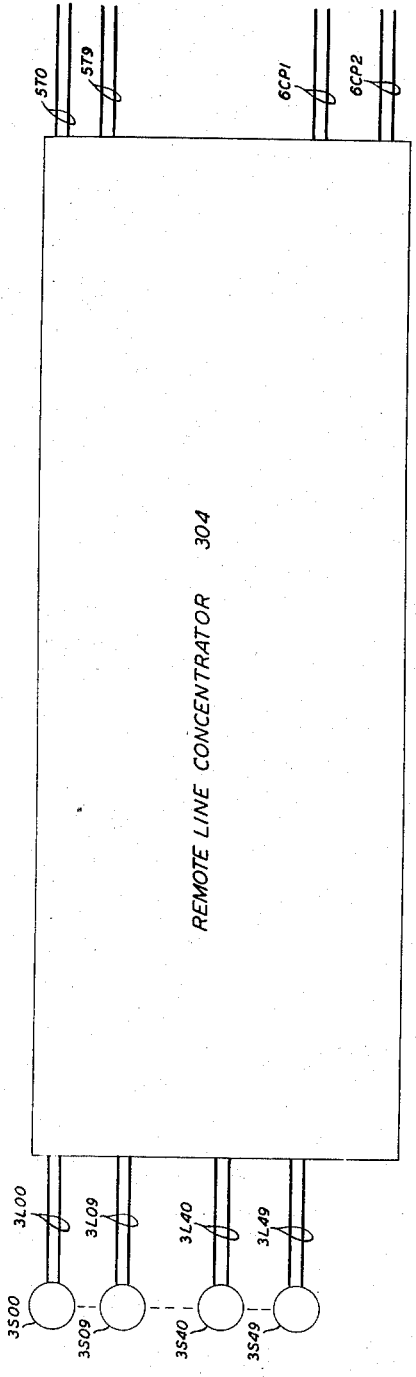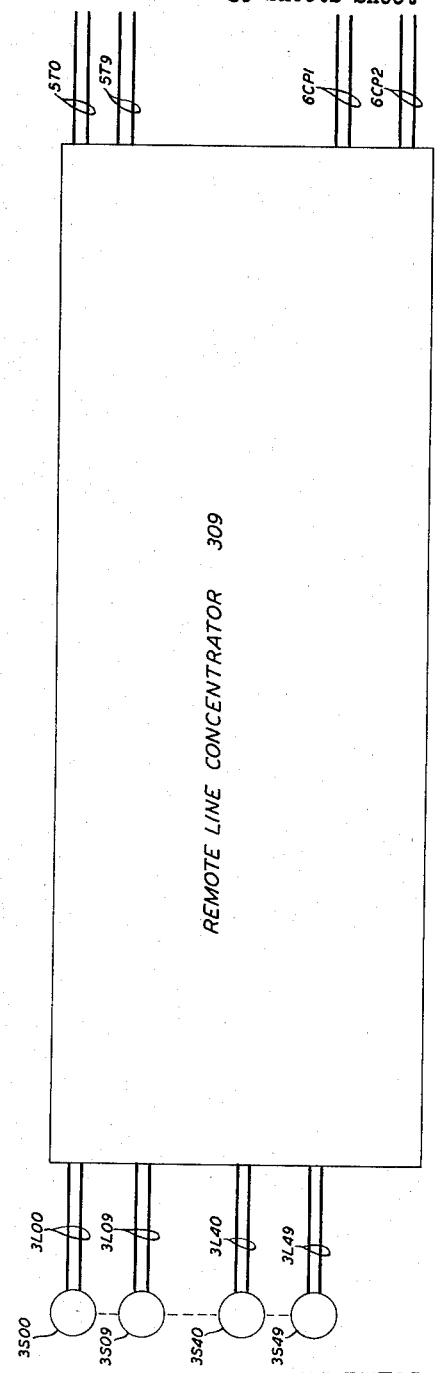
FIG. 7
INVENTOR
G. F. ABBOTT, JR.
BY
Harold C. Herman
ATTORNEY Nov. 29, 1960  G. F. ABBOTT, JR  2,962,555
LINE CONCENTRATOR SYSTEM
Filed Dec. 31, 1957  13 Sheets-Sheet 9

INVENTOR
G. F. ABBOTT, JR.
BY
Harold C. Herman
ATTORNEY

INVENTOR
G. F. ABBOTT, JR.
BY
Harold C. Herman
ATTORNEY

Nov. 29, 1960 G. F. ABBOTT, JR 2,962,555
LINE CONCENTRATOR SYSTEM
Filed Dec. 31, 1957 13 Sheets-Sheet 13

INVENTOR
G. F. ABBOTT, JR.
BY
Harold C. Herman
ATTORNEY

United States Patent Office 2,962,555
Patented Nov. 29, 1960

2,962,555

LINE CONCENTRATOR SYSTEM

George F. Abbott, Jr., Pearl River, N.Y., assignor to Bell Telephone Laboratories, Incorporated, New York, N.Y., a corporation of New York Filed Dec. 31, 1957, Ser. No. 706,338

20 Claims. (Cl. 179—18)

This invention relates to line concentrator systems and more particularly to line concentrator systems which may be utilized in any of the conventional telephone systems.

In conventional telephone systems each substation normally requires a pair of wires to connect it with the central office. These wires or lines are the most inefficiently utilized portions of the telephone system because on the average they are utilized infrequently compared to the usage of the common equipment in the central office. Moreover, for a substation which is located at a considerable distance from the central office the cost of these wires is substantial. In fact, in the present day telephone plant a large portion of the cost of installation and operation relates to the wires used in the subscriber loops between the substations and the central office. The utilization of a line concentrator system becomes attractive where the distances between groups of substations and the central office are large while the number of substations and the amount of local interconnecting traffic among the substations are not adequate to justify their connection to a separate central office. Line concentrator systems are also utilized when cable is unavailable, or to give temporary service.

It is a general object of this invention to improve the efficiency of utilizing subscriber lines by connecting them through a line concentrator to the central office.

Another general object of this invention is to provide a line concentrator system which may be utilized with any of the conventional telephone systems.

A more specific object of this invention is to establish connections between the subscriber lines and line terminations associated therewith in the central office without changing the potential conditions at the line terminations except for the usual closure change indicating a service request or off-hook condition.

Still another object of this invention is to avoid the necessity of outpulsing the identity of subscriber lines to a remotely located line concentrator.

In an illustrative embodiment of this invention, the line concentrator system includes concentrator and expander pairs. The concentrators are remotely located and the expanders are located at the central office. Each concentrator functions to establish connections between a number of subscriber lines and a smaller number of concentrator trunks which extend from the associated expander at the central office. Each expander functions to establish connections between a number of line terminations, which are individually associated with the subscriber lines, and the concentrator trunks. Each concentrator and expander pair is operated to establish a connection from any one of the subscriber lines through a selected concentrator trunk to the associated central office line termination. At the central office, the line terminations are handled by a conventional telephone system as ordinary lines. The line concentrator system may be utilized with any of the conventional telephone systems. For example, it may be utilized with the crossbar telephone system of the type described in the Patent 2,585,904, granted to A. J. Busch on February 19, 1952.

A feature of this invention relates to means for cyclically and synchronously scanning both the subscriber lines and their associated line terminations at the central office. The scanning means functions to determine the service conditions of both lines and line terminations. By scanning the line terminations as well as the subscriber lines, the necessity of transmitting the line identity to or from the line concentrator is avoided because both the line concentrator and the central office automatically register the line identity when a call is initiated to or from a subscriber line. When a call is initiated to or from a subscriber line, the service request is detected and the identity of the line is registered at the central office if an idle trunk is available for the subscriber line.

Another feature of this invention pertains to means for inhibiting the recognition of service requests when a concentrator trunk is unavailable for the call.

Still another feature of this invention relates to means for tripping ringing tone and for supplying busy tone for terminating calls to lines for which concentrator trunks are unavailable. If a trunk is available, the line identity is registered and a trunk selection sequence is initiated.

A further feature of this invention pertains to means for simultaneously selecting an idle trunk and outpulsing its identity. The trunk identity may be supplied to the remote concentrator during the trunk selection sequence because the availability of an idle trunk was previously established when the service request was recognized. With the trunk identity outpulsed to the concentrator, the concentrator and expander function to connect the selected trunk between the associated line and line termination.

Still a further feature of this invention relates to means for establishing a random preference for selecting trunks and for providing a pulsed indication of the identity of the selected trunk.

Still another feature of this invention pertains to means for maintaining the talking connection through the concentrator and expander when the call is ended. When a trunk is selected for a call, it is first disconnected from the line and termination previously connected thereto.

Still another feature of this invention relates to means for disconnecting the scanning means for a concentrator line when a connection is established thereto and for reconnecting the scanning means only when the trunk utilized for the connection is selected for a subsequent call.

In all, the remote line concentrator has four operating conditions: a normal scanning condition; a trunk identity receiving condition with scanning halted; a disconnect condition when the prior selected trunk connection is being disconnected; and a connect condition when the selected trunk is being connected.

A further feature of this invention pertains to means at the concentrator for providing a check signal to the central office when the disconnect and connect operations are completed at the concentrator.

Further objects and features will become apparent upon consideration of the following description taken in conjunction with the drawing, wherein:

Fig. 2 illustrates the arrangement of Figs. 3 through 12;

Figure 8:
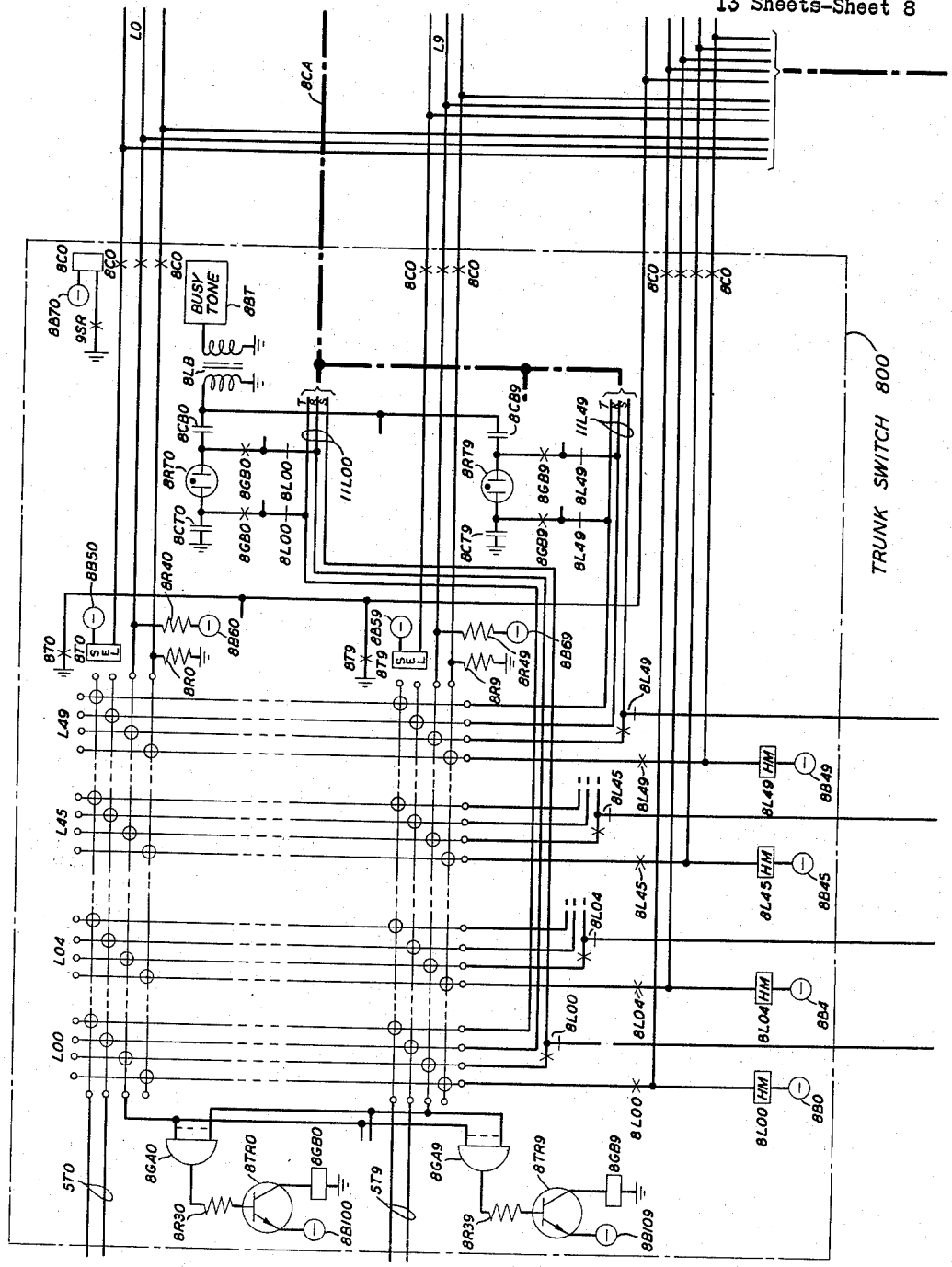
Figure 9:
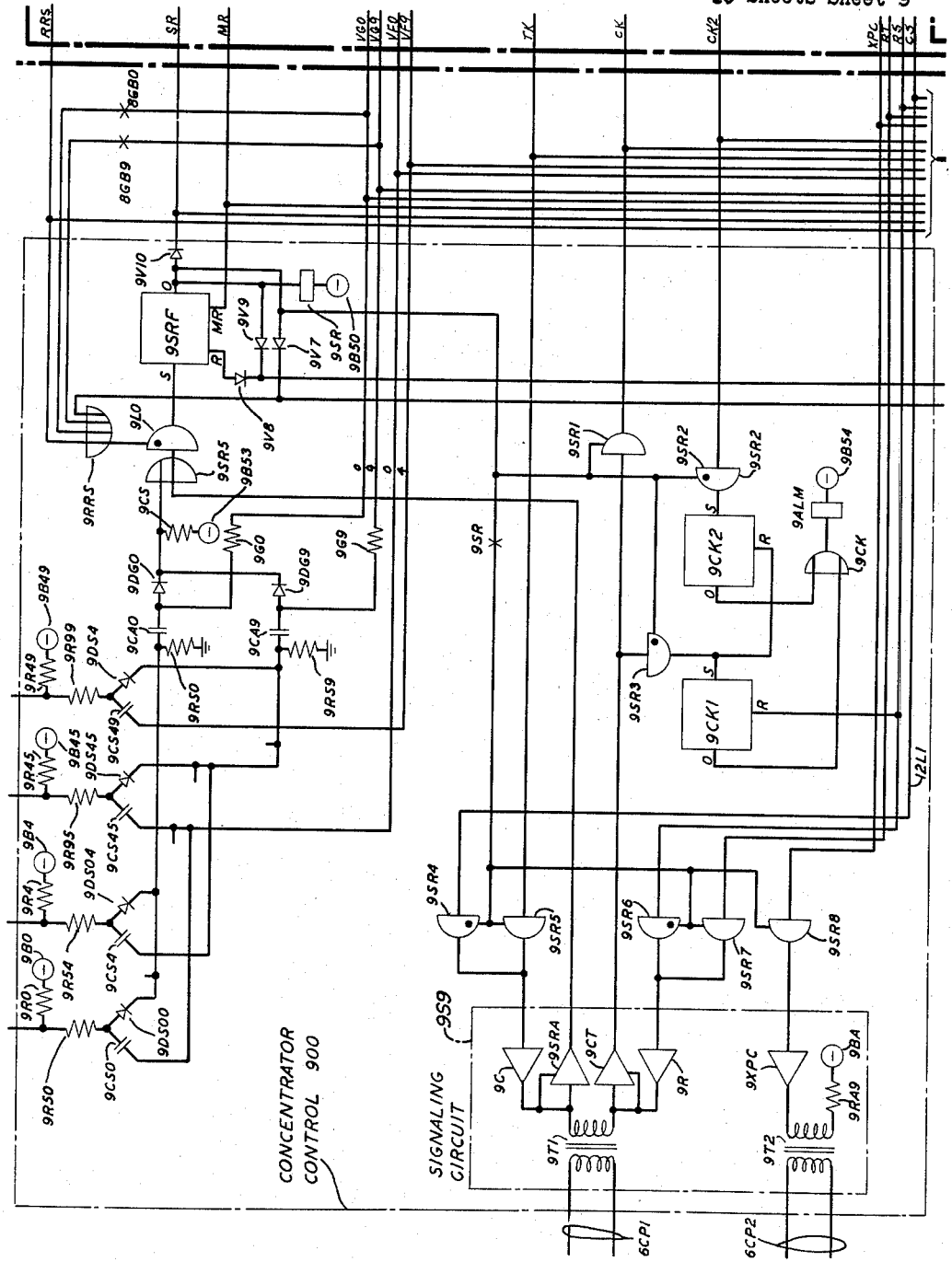
Figure 10:
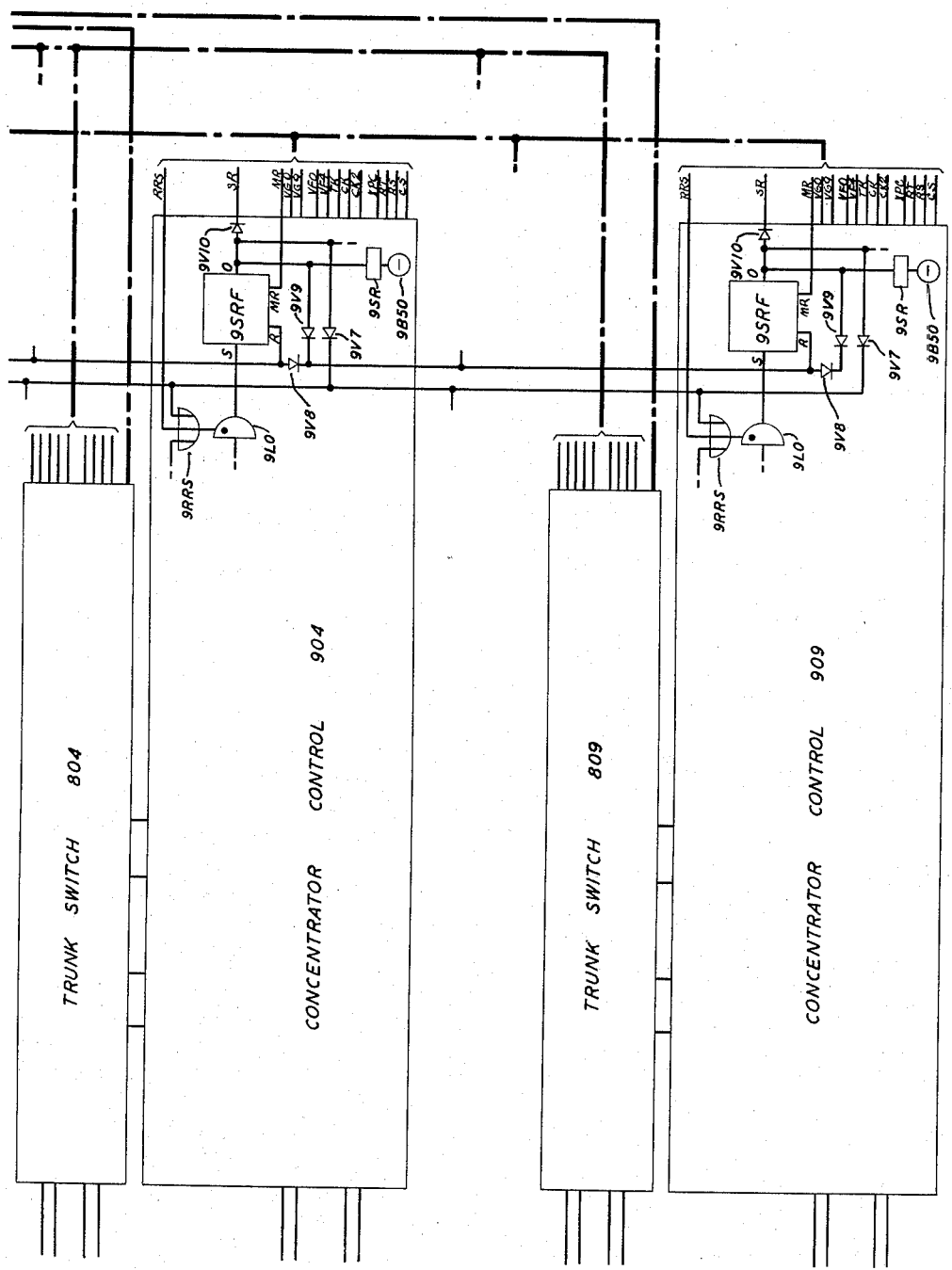
Figure 11:
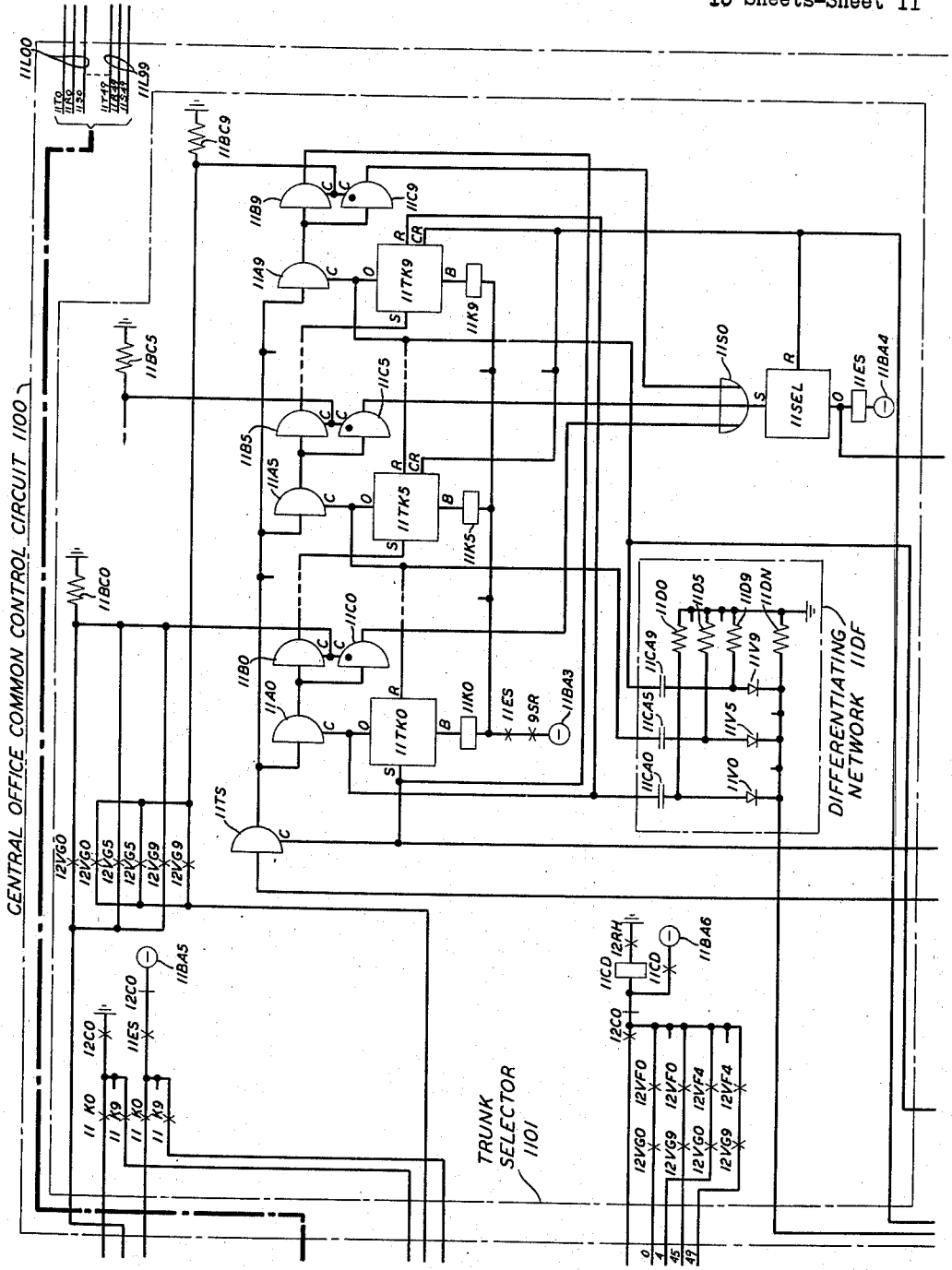
Figure 12:
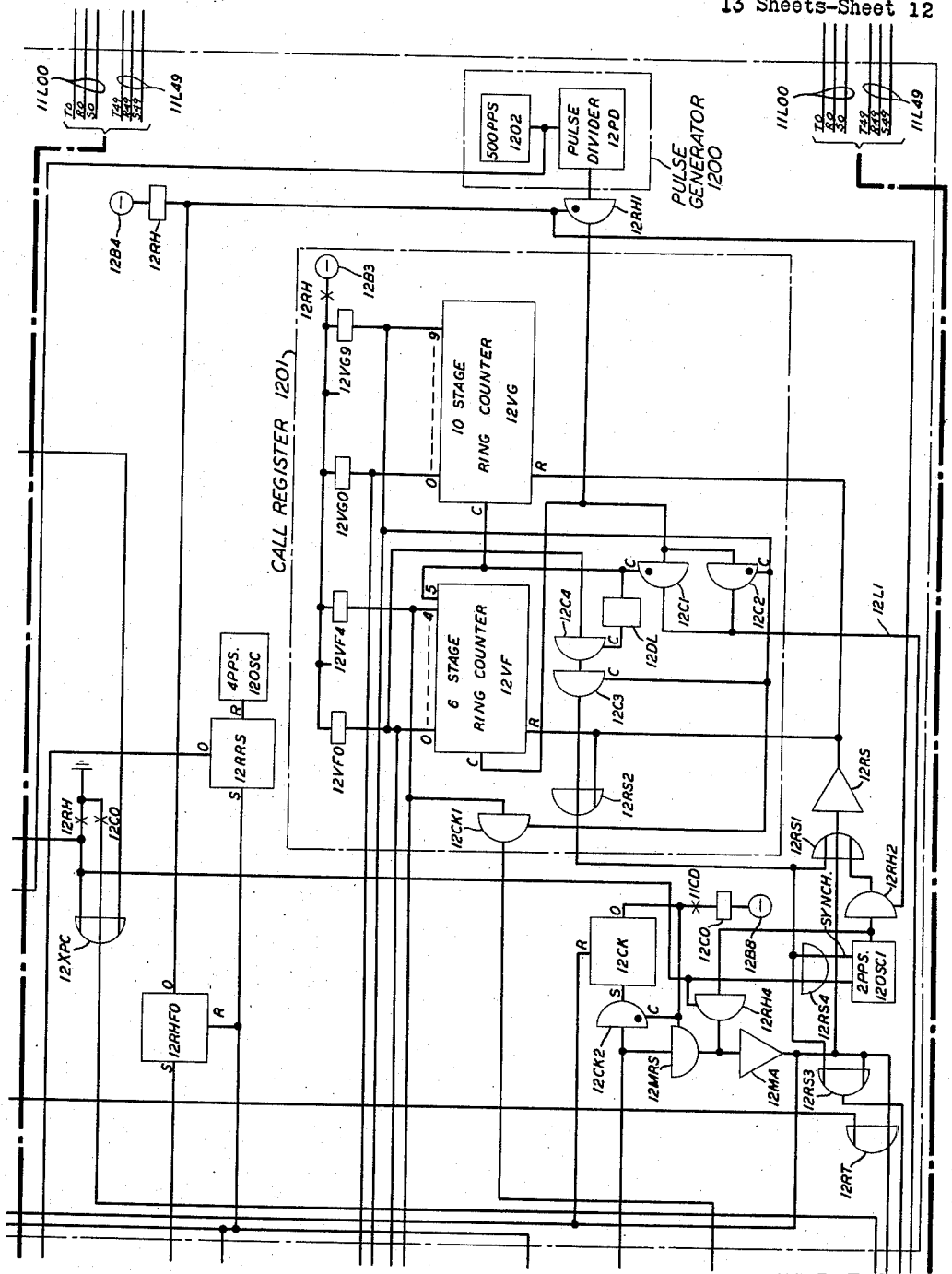
Figure 13:
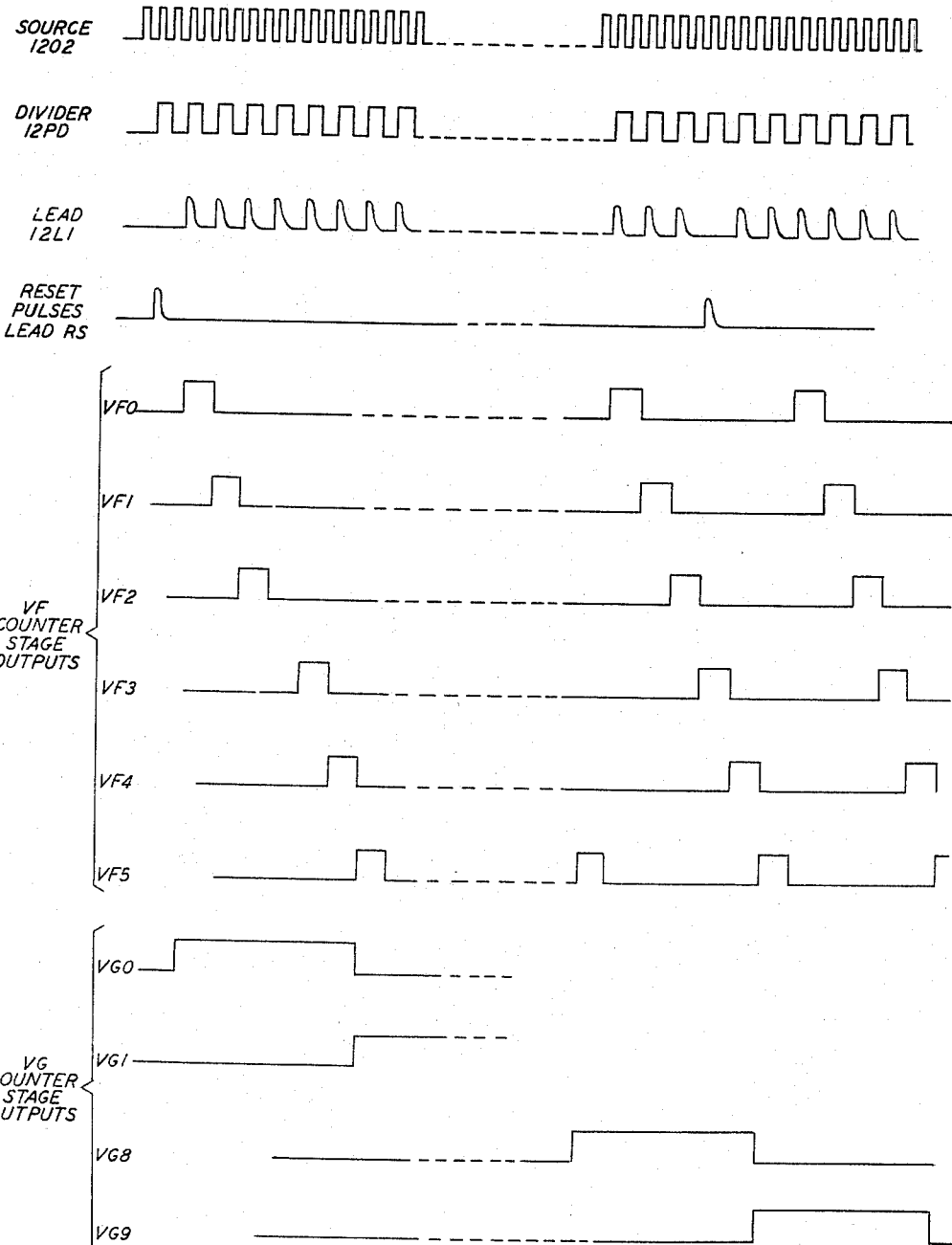

Figs. 3 through 12, when arranged in accordance with Fig. 2, are a detail circuit drawing of the universal concentrator system of this invention wherein Figs. 3 through 6 illustrate a line concentrator unit;

Fig. 7 functionally illustrates two other line concentrators;

Fig. 8 illustrates a line expander or trunk switch at the central office;

Fig. 9 illustrates a control circuit at the central office;

Fig. 10 functionally illustrates two other trunk switches and two other control circuits at the central office;

Fig. 11 illustrates a common control trunk selector in the central office common control circuit; and Fig. 12 illustrates a common control pulse generator and register at the central office;

Fig. 13 is a series of curves illustrating the scanning sequence; and

Fig. 14 is a table illustrating the trunk connections.

GENERAL DESCRIPTION

Figure 1:
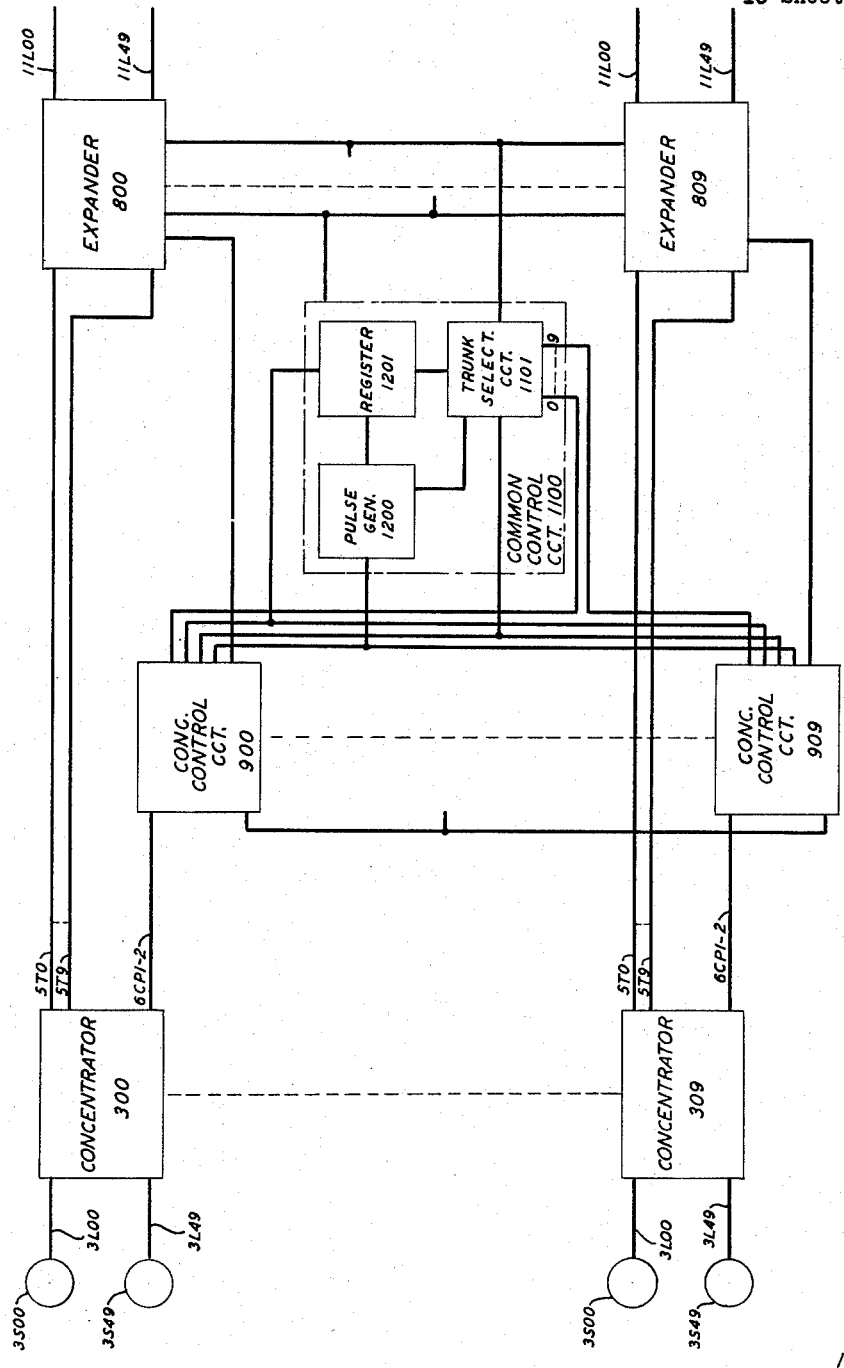
Fig. 1 is a functional or box diagram drawing of the concentrator system of the present invention.
Figure 3:
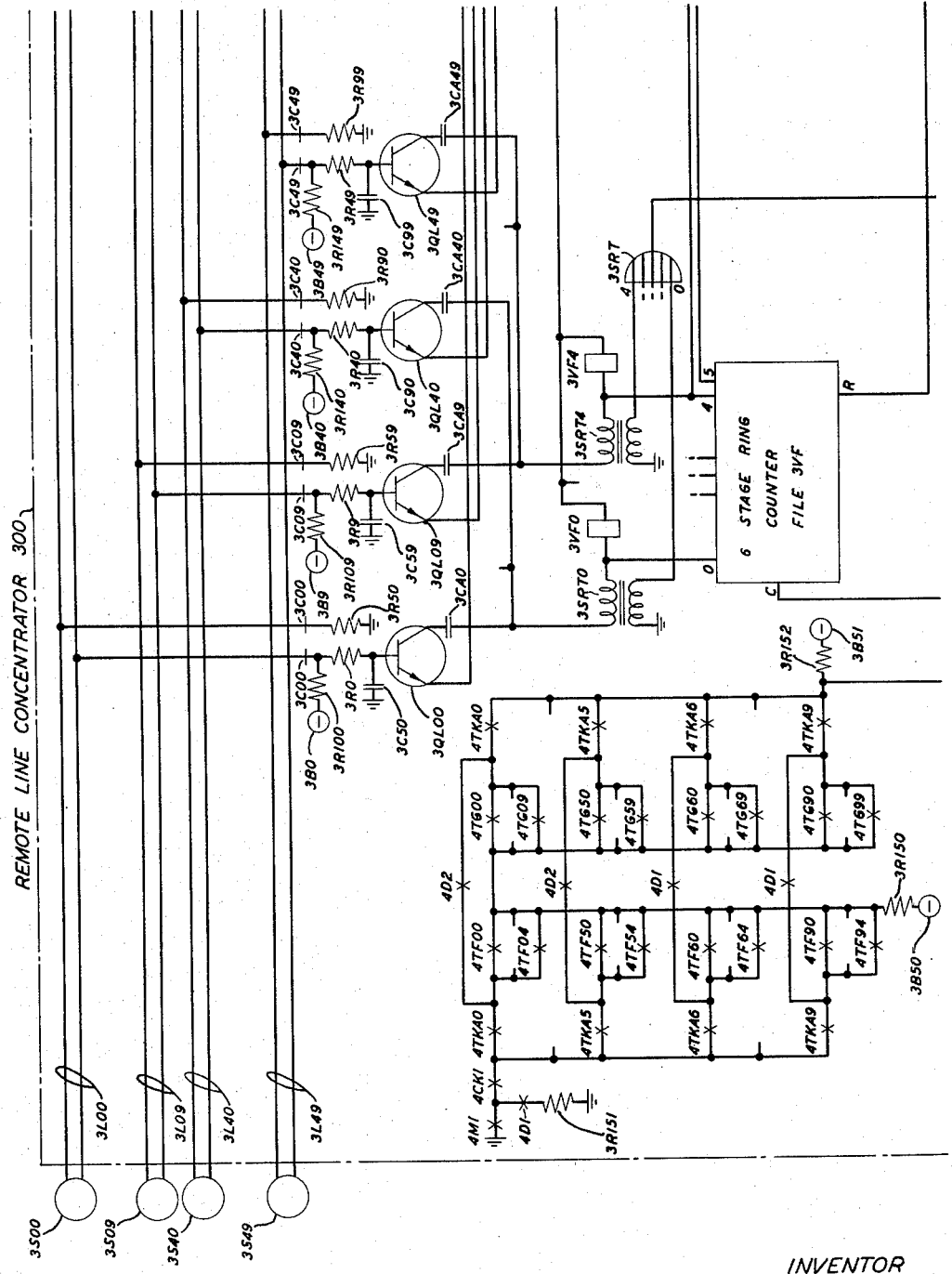
Figure 4:
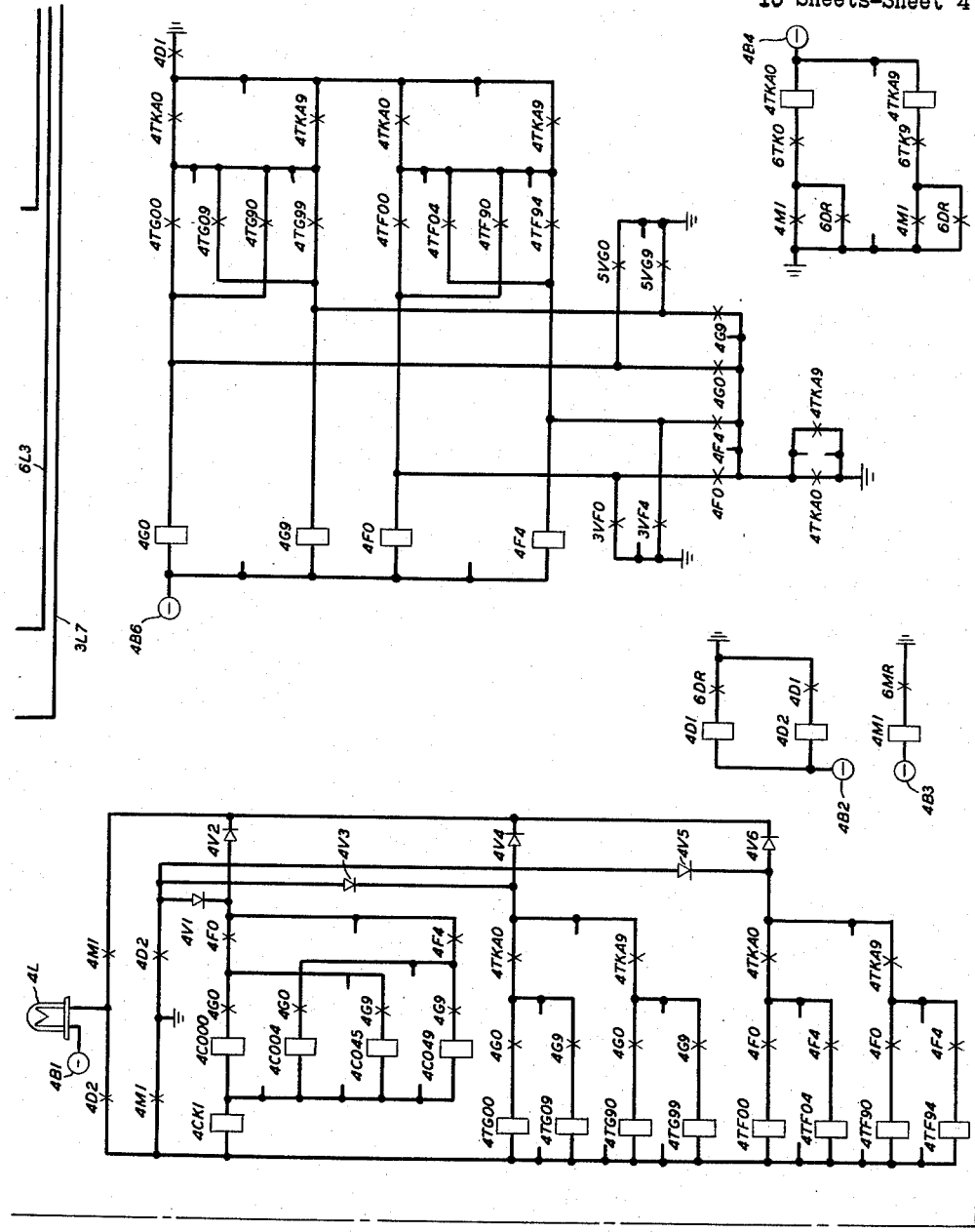
Figure 5:
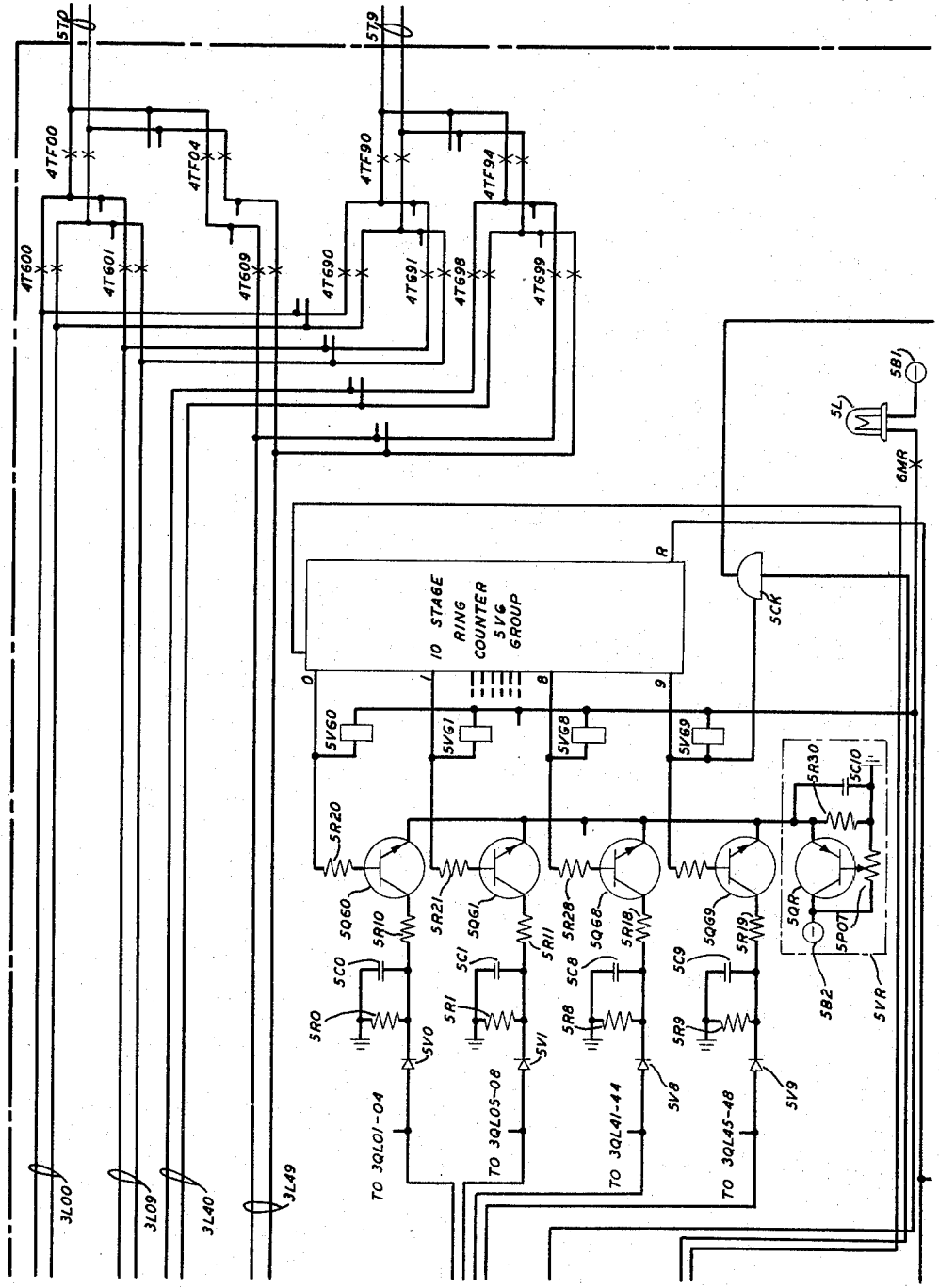

Referring to Fig. 1, which is a functional or a box diagram of the universal line concentrator system of this invention, the reference numbers generally indicate the figure in the detail circuit drawing in which the circuit or box appears. For example, the concentrator 300 is shown partially in Fig. 3.

The line concentrator 300 is one of ten line concentrators 300–09 which function to establish connections from ten sets of substations 3S00–49. The number of concentrators may be larger or smaller depending upon the traffic load received by a common control circuit 1100. The concentrators 300–09 and their associated substations 3S00–49 are remotely located and all the rest of the equipment shown in Fig. 1 is located at the central office. The substations 3S00–49 are connected, respectively, by fifty lines 3L00–49 to the associated one of the concentrators 300–09. Each of the concentrators 300–09 is connected by means of ten trunks 5T0–9 and two control pairs 6CP1–2 to the central office. Each set of trunks 5T0–9 provides talking paths between the associated one of the line concentrators 300–09 and the central office and each set of control pairs 6CP1–2 provides signaling paths to and from the central office. The effect of utilizing the line concentrators 300–09 is to place a part of the central office switching equipment at a remote location and the purpose of so doing is to more efficiently utilize the connections extending from the central office. With fifty subscriber lines 3L00–49 connected to each of the ten line concentrators 300–09, there are a total of 500 subscriber lines which are served by the central office equipment.

In the central office the ten sets of ten trunks 5T0–9 are connected, respectively to ten individually associated trunk switches or line expanders 800–09. Each of the switches or expanders 800–09 provides connections between its associated set of ten trunks 5T0–9 and fifty line terminals or terminations 11L00–49. The line terminations 11L00–49 are associated individually with the subscriber lines 3L00–49 which are connected to the associated one of the line concentrators 300–09. Each concentrator-expander pair, such as concentrator 300 and expander 800, functions to provide connections from the subscriber lines 3L00–49 connected to the concentrator through the ten trunks 5T0–9 interconnecting the concentrator and the expander to the line terminals or terminations 11L00–49 connected to the expander. For example, the line terminal 11L40, which is connected to the expander 800, is associated with the subscriber line 3L04 which is connected to the concentrator 300. As hereinafter described, when a call is initiated to or from the subscriber line 3L04 of concentrator 300, the line concentrator system functions to establish a connection from the line 3L04 to the line terminal 11L04 of expander 800.

The ten sets of line terminals 11L00–49 appear to a telephone system, not shown, just as if they were ordinary subscriber lines. In other words, as far as the telephone system is concerned, the line terminals 11L00–49 are the subscriber lines. The telephone system to which the line terminals 11L00–49 are connected is not shown and the concentrator system of the present invention may be utilized with any of the conventional types of telephone systems.

With all ten sets of subscriber lines 3L00–49 and all ten sets of line terminations 11L00–49 idle, the central office continuously and synchronously scans the lines 3L00–49 and the terminals 11L00–49. All ten lines and all ten line terminals having a similar designation are scanned at the same time. For example, all ten lines 3L04 which are connected individually to the ten concentrators 300–09 and all ten line terminals 11L04 which are connected individually to the ten expanders 800–09 are scanned simultaneously.

The ten line concentrators 300–09 and the ten expanders 800–09 are controlled by a scanner pulse generator 1200 which simultaneously provides count pulses through a register 1201 and ten control circuits 900–09, in parallel, and the ten sets of control pairs 6CP1–2 to the concentrators 300–09. The control circuits 900–09 are individually associated with the concentrator-expander pairs and the generator 1200 is part of the control circuit 1100 which is common to all concentrator-expander pairs.

The register 1201 also supplies three types of pulses to the circuits 900–9: vertical group pulses under control of the count pulses from the generator 1200; vertical file pulses; and reset pulses. The vertical file, vertical group and reset pulses, which are illustrated in Fig. 13, are supplied to each of the control circuits 900–09 and the count pulses and reset pulses are provided to the concentrators 300–9. The vertical group pulses function to identify a group of subscriber line terminations and the vertical file pulses function to identify terminations in the group. As in ordinary crossbar telephone systems, the subscriber lines are arbitrarily arranged in vertical groups and vertical files. Such crossbar telephone systems are described, for example, in the above-identified Busch patent. The subscriber lines 3L00–49 connected to each of the ten line concentrators 300–09 and their associated terminations are subdivided into ten vertical groups each of which includes five vertical files. Each of the vertical group pulses supplied from the register 1201 selects a group of five line terminations connected respectively to each of the expanders 800–09. Since each vertical group pulse is supplied in parallel to the ten circuits 900–09 it functions to select five times ten or fifty line terminations. Between two such vertical group pulses the register 1201 supplies five vertical file pulses to the circuits 900–09. One line termination connected to each of the expanders 800–09 or ten in all are scanned by each vertical file pulse. In order to scan the 500 terminations, the register 1201 provides, to each of the ten circuits 900–09, ten 15-volt vertical group pulses spaced at intervals of 24 milliseconds and five 15-volt vertical file pulses spaced at intervals of 4 milliseconds between each pair of vertical file pulses. As shown in Fig. 13, the vertical file pulses are 4 millisecond pulses and the vertical group pulses are 24 millisecond pulses, and the complete scanning cycle has a duration of 240 milliseconds.

The reset pulse to each of the control circuits 900–09 is also supplied over the associated control pairs 6CP1–2 to the line concentrators 300–09. In addition to the reset pulse, the count pulses to the register 1201 are supplied therefrom through the circuits 900–09 and the control pairs 6CP1–2 to the concentrators 300–09. The register 1201 blanks or blocks the count pulse which occurs with the reset pulse.

In the line concentrators 300–09 counters, not shown in Fig. 1, function to provide vertical file and vertical group pulses which function to scan the subscriber lines 3L00–49. The register 1201 functions as a scan pulse counter in the central office. In this manner the lines 3L00–49 and terminations 11L00–49 are synchronously and cyclically scanned under control of the generator 1200.

When any one of the subscriber lines 3L00–49 is closed to initiate a service request, the associated one of the concentrators 300–9 supplies a service request pulse in the time slot during which the line is scanned to the associated concentrator control circuit in the central office. For example, if line 3L00 of concentrator 300 initiates a service request, a service request pulse is provided to the circuit 900 through the control pairs 6CP1-2 during the time slot that the line 3L00 is scanned. For a terminating call to any one of the lines 3L00-49, a service request pulse is provided at the concentrator control circuit 900 due to scanning the terminations 11L00-49. For example, if the line termination 11L00 of expander 800 is in a calling condition, a service request is provided in the circuit 900 during the time slot during which the terminal 11L00 and the line 3L00 are scanned. As described above, the line 3L00 and the termination 11L00 are scanned during the same time slot. In this manner a service request can be received at the concentrator control circuit 900 from either the line concentrator 300 or due to a request at expander 800 for a call to the concentrator 300. Either service request initiates a similar sequence of operations in the central office for selecting an idle one of the trunks 5T0-9 which connect the concentrator 300 to the expander 800.

As is hereinafter described when a service request pulse is recognized at one of the control circuits 900-09, it interrupts the scanning sequence of operation to stop the associated concentrators 300-9 and the call register 1201 at the identity of the calling line or line termination. If a call is initiated on line 3L00 connected to the concentrator 300, the circuit 900 halts the call register 1201 at the vertical group 0 and the vertical file 0.

The service request is recognized in the concentrator control circuit 900 only when one of the trunks 5T0-9 is available for the originating or terminating connection. As is hereinafter described, each of the lines 3L00-49 is connectable to only a combination of six trunks of the ten trunks 5T0-9 and the associated line terminations 11L00-49 are connectable to the same six trunks. Fig. 14 illustrates the possible connections for each vertical group to the trunks 5T0-9. For example, the lines 3L00-04 and the line terminations 11L00-04 in vertical group 0 can be connected only through the trunks 5T0-3, 5T8 and 5T9. A connection cannot be provided through any of the trunks 5T4-7. If all six trunks, which are connectable to the calling or called line, are busy, the service request indication is not recognized at the concentrator control circuit 900 and the register 1201 is not halted.

If all six trunks available for the vertical group are busy, the expander 800 provides an inhibiting potential to the concentrator control circuit 900. The expander 800 monitors the trunks 5T0-9 with separate indications being provided for each vertical group. In other words, the combinations of trunks connectable for each vertical group are separately monitored. In this manner as long as all trunks connectable for the vertical group 0 are busy, service requests therefrom are not recognized at the control circuit 900. In effect, the vertical group 0 is omitted in the scanning cycle because service requests therefrom are not recognized. Service requests from the other vertical groups may be recognized.

For terminating calls to one of the lines 3L00-49 the expander 800 supplies busy tone to the associated one of the line terminations 11L00-49 in the event all six trunks are busy. In addition, a connection is provided to trip ringing.

Assuming that a trunk is available for establishing a connection between the line 3L00 and the termination 11L00, the service request pulse is recognized at the circuit 900 and the register 1201 is stopped to register the line identity. When the circuit 900 is operated, it blocks the reception of service request pulses at all ten circuits 900-9 and it locks out the circuits 901-09. In the event of two simultaneous service requests at two of the circuits 900-9, the lowest designated one is preferred. The register 1201, the generator 1200 and a trunk selector 1101 are part of the common control circuit 1100. When the register 1201 is operated to register the line identity, the common control circuit 1100 causes the expander 800 to supply trunk availability information to the trunk selector 1101. When the common control circuit 1100 operates the expander 800, it also blocks the count pulses from the generator 1200 to the concentrator control circuits 900-9. In this manner the line concentrators 300-9 are also halted at the line identity. In addition to halting the concentrators 300-9, the circuit 1100 also provides a control signal through the control circuit 900 and the control pairs 6CP1-2 to the concentrator 300. The concentrator 300 has a normal condition during which the lines 3L00-49 are scanned and three operating conditions: trunk identity reception; trunk disconnect; and trunk connect. The first control pulse from the central office initiates the first operating condition by readying the line concentrator 300 for receiving trunk identifying pulses.

A trunk selection sequence is initiated at the trunk selector circuit 1101 at the same time that the first control pulse is provided to the line concentrator 300. The trunk selector circuit 1101 utilizes pulses at a rate of 500 pulses per second from the pulse generator 1200 and trunk availability information from the expander 800 to make a random selection of the idle trunks in the trunk multiple connectable between the line 3L00 and the line termination 11L00. During the trunk selection sequence the trunk selector circuit 1101 provides trunk identifying pulses through the concentrator control circuit 900 to the concentrator 300. The trunk identifying pulses can be sent as the trunk selection sequence proceeds because the availability of at least one trunk for the connection has already been determined when the service request was recognized at the circuit 900.

The trunk switch or expander 800 functions to establish connections between the ten trunks 5T0-9 from the concentrator 300 and the fifty terminations 11L00-49 connected to the switch 800. When one of the trunks 5T0 is busy, a relatively positive potential is provided to the trunk selector 1101 from the expander 800. More specifically, if one of the trunks is busy, the switch 800 functions to extend a connection to the selector 1101 from the sleeve lead of the line termination to which the trunk is connected. The sleeve leads of the terminations 11L00-49 are normally at a minus 48-volt potential but are at a ground potential to indicate a busy condition. Suppose, for example, that trunk 5T0 is busy being utilized for a connection between the line 3L49 and the line termination 11L49. A ground potential would then be present at the sleeve lead of the termination 11L49 which would be extended through the expander 800 in the trunk selector circuit 1101. As described above and shown in Fig. 14, only six of the trunks are available for connection to any one of the lines 3L00-49 and there is a different six for the lines in each vertical group. The six trunks available to a group are referred to as a trunk multiple. For example, the trunk multiple connectable for the lines 3L00-04 in the vertical group 0 includes trunks 5T0, 5T1, 5T2, 5T3, 5T8 and 5T9. In other words, for a call to or from line 3L00, an idle one of the trunks 5T0-3, 5T8 and 5T9 is selected. Trunks 5T8 and 5T9 are common to all ten multiples.

The trunk selector 1101 provides for a random selection of the idle trunks in the trunk multiple and supplies a number of pulses indicating its identity on a decimal basis with one pulse being supplied to identify trunk 5T0, two pulses for trunk 5T1, etc. When the trunk selector circuit 1101 completes the trunk selection and outpulsing sequence, it provides a second control pulse through the circuit 900 and the control pairs 6CP1-2 to the concentrator 300. The second control pulse causes the concentrator 300 to initiate its second operating condition wherein the selected trunk is disconnected from its previous connection. When a call is ended with the receiver returned to its cradle, the talking connection remains established, though an idle indication for both line and trunk is provided at the central office. In other words, though the selected trunk provides for an idle indication at the trunk switch 800, it remains connected between an idle one of the lines 3L00–49 and the associated one of the line terminations 11L00–49. Suppose, for example, that the selected trunk was last utilized for a call to or from line 3L09. The disconnect control pulse at the concentrator 300 causes the disconnection of the trunk 5T9 from the line 3L09. When the disconnect sequence is completed a check pulse is provided back to the circuit 900. A similar and concurrent sequence occurs in the central office trunk switch 800 for disconnecting the trunk 5T9 from the associated line termination 11L09. The sequence is initiated by the trunk selector circuit 1101 after the selection and outpulsing sequence is completed.

When the disconnect check pulse is received at the central office from the concentrator 300, a connect sequence of operations is initiated both at the central office and at the concentrator 300. The disconnect check pulse is provided through the circuit 900 to the control circuit 1100. The control circuit 1100 operates the expander 800 to connect the selected trunk to the line termination 11L00 and it also provides a third control pulse through the circuit 900 to the concentrator 300. The concentrator 300 thereupon connects the selected trunk to the calling line 3L00, disconnects the scanning equipment from line 3L00 and returns a connect check pulse to the concentrator control circuit 900. The connect check pulse is supplied through the circuit 900 to the common control circuit 1100 which thereupon initiates a release sequence for releasing the circuit 1100 and the circuit 900. The control circuit 1100 also provides a reset pulse to the concentrator 300 returning it to normal. When the control circuit 1100 and the circuit 900 are reset, the normal scanning sequence is resumed. The control circuit 900, however, inhibits the recognition of service requests for a random interval so that effectively the scanning cycle is resumed at a random point.

The scanning sequence continues with the line 3L00 omitted from the scanning cycle because it is dissociated from the scanning equipment. When the subscriber at station 3S00 hangs up, a connection remains established through the selected trunk to the termination 11L00. The potential at the sleeve lead of the line termination 11L00, however, returns to minus 48 volts so that both the line 3L00 and the selected trunk thereafter test idle. When the selected trunk is thereafter selected for another call, it is disconnected from line 3L00 and termination 11L00 during the sequence, described above, for establishing the new connection. If the same line 3L00 requires service again before the selected trunk is disconnected, no further action is required by the line concentrator system as the connection to the line termination 11L00 is already established.

DETAILED DESCRIPTION

Figure 6:
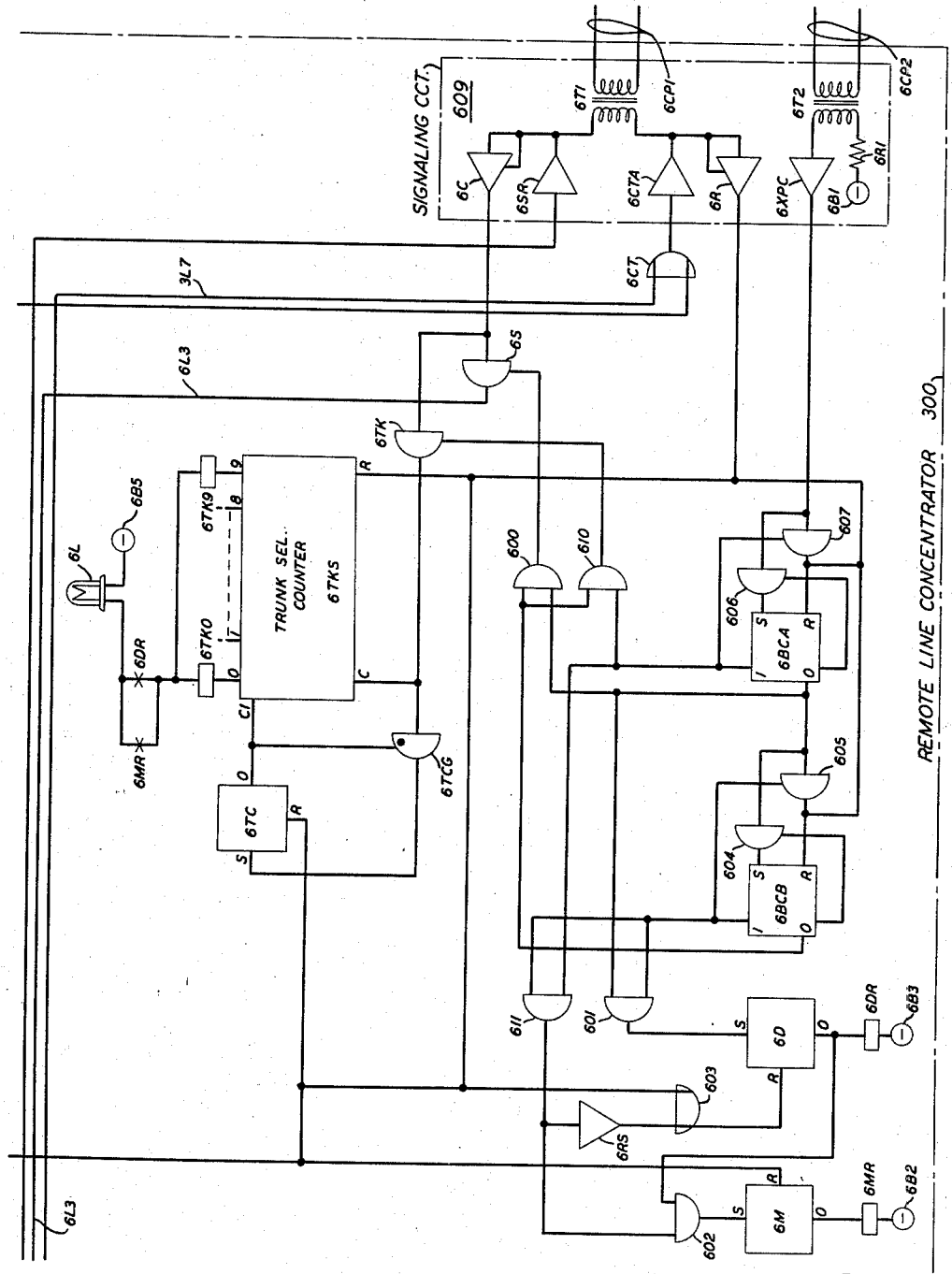

Referring to Figs. 3 through 12, when arranged in accordance with Fig. 2, the first digit or digits of each reference number generally indicates the figure in the circuit drawings in which the component appears and the letters of each reference number indicate the function of the component. For example, the gate 6TK is a trunk gate which is shown in Fig. 6.

Ten line concentrators 300–09 are connected to the central office, shown in Figs. 7 to 12 though only one, the line concentrator 300, is shown in detail. The number of line concentrators that may be utilized is determined by the traffic that can be handled by the common control circuit 1100 in the central office. The line concentrator 300 is shown in Figs. 3 through 6, the concentrators 304 and 309 are shown functionally as boxes in Fig. 7 and the other concentrators 301—303 and 305—308 are not shown. Each of the line concentrators 300–09 provides a connection from fifty subscriber stations 3S00–49 to the central office. Only the stations 3S00, 3S09, 3S40 and 3S49 are shown connected to the concentrators 300, 304 and 309. The effect of utilizing a line concentrator is to place a part of the switching equipment of the central office at a remote location in order to conserve outside plant facilities and more efficiently utilize the connections from the subscriber stations to the central office. Each of the line concentrators 300–09 is connected to the central office by ten trunks 5T0–9 and two control pairs or trunks 6CP1–2. Each set of trunks 5T0–9 provides talking paths between the associated one of the line concentrators 300–09 and the central office, and each set of control pairs 6CP1–2 provides signaling paths to and from the central office equipment. With fifty subscriber stations 3S00–49 connected respectively to each of the ten line concentrators 300–09 by fifty lines 3L00–49, there are a total of 500 subscriber lines which are served by the central office equipment.

In the central office, the ten sets of ten trunks 5T0–9 are connected, respectively, to ten expanders or trunk switches 800–09. Each of the expanders 800–09 functions to connect its associated set of ten trunks 5T0–9 to fifty line terminations 11L00–49. The line terminations 11L00–49 are associated individually with the subscriber lines 3L00–49 connected to the associated one of the line concentrators 300–09. Each concentrator-expander pair, such as concentrator 300 and expander 800, functions to establish connections from the subscriber lines 3L00–49 connected to the concentrator, through the ten trunks 5T0–9, interconnecting the concentrator and the expander, to the line terminals 11L00–49 connected to the line expander. For example, the line terminal 11L09, which is connected to the expander 800, is associated with the subscriber line 3L09, which is connected to the concentrator 300. As is hereinafter described, when a call is initiated to or from the subscriber line 3L09 of concentrator 300, the line concentrator system functions to establish a connection from the line 3L09 to the line terminal 11L09 of expander 800.

Normal scanning

With all 500 subscriber lines idle, the central office continuously and synchronously scans the ten groups of subscriber lines 3L00–49 and their associated line terminals 11L00–49. All the lines and line terminals having a similar designation are scanned at the same time. For example, all ten lines 3L09 and all ten line terminations 11L09 are scanned simultaneously.

In a central office common control circuit 1100, a pulse generator 1200 simultaneously provides counting pulses in parallel through ten concentrator control circuits 900–09 to the ten line concentrators 300–09. The circuit 900 is shown in some detail, the circuits 904 and 909 are shown functionally and the circuits 901–903 and 905–908 are not shown. The counting pulses are provided in parallel to the ten line concentrators 300–09 through the ten circuits 900–09 and the ten sets of control pairs 6CP1–2. The concentrator control circuits 900–09 are individually associated with each concentrator-expander pair. The pulse generator 1200 also supplies the counting pulses to a call register 1201, and to a trunk selector 1101. The generator 1200, the register 1201 and the selector 1101 are part of the central office common control circuit 1100. The ten line concentrators 300–09 and the register 1201 are synchronously and cyclically operated under control of the counting pulses from the generator 1200.

The pulse generator 1200 includes a pulse source 1202 which supplies positive pulses at a rate of 500 per second to a pulse divider 12PD in the generator 1200 and to the input of an enabling gate 11TS in the trunk selector 1101. The enabling gate 11TS is one of a number of circuit components, known in the art, which are utilized in the illustrative embodiment of this invention. Such components, including enabling gates, inhibiting gates, AND gates, OR gates, flip-flop circuits, amplifiers, ring counters, etc. are disclosed, for example, in the Patent 2,812,385 granted on September 24, 1957, to Joel-Krom-Posin.

An enabling gate is a three-terminal device which normally inhibits the passage of pulses from its input terminal to its output terminal. When a control potential, however, is provided to its control terminal C, the gate is enabled to allow the passage of pulses. The enabling gate 11TS is therefore normally disabled to inhibit the passage of pulses. An enabling gate is shown in Figs. 3 to 12 as a semicircle and an inhibiting gate, which normally allows the passage of pulses, is shown as a semicircle with a dot in the semicircle. The gates 12C1 and 12C2 in the call register 1201 are illustrative of inhibiting gates.

As described above, the source 1202 also supplies the pulses to the pulse divider 12PD. The pulse divider 12PD divides the number of pulses by a factor of 2, as indicated by the curves shown in Fig. 13, and supplies them through an inhibiting gate 12RH1 to the input terminal C of a six-stage ring counter 12VF in the call register 1201. The register 1201 includes two ring counters 12VF and 12VG which together function to provide a 50-pulse cycle which is utilized to scan the line terminations 11L00–49. The register 1201 is, in this manner, effectively a scan pulse generator because in addition to registering the identity of the lines for which service is requested it also provides pulses utilized in the scanning cycle.

The register 1201 supplies three types of pulses which are also illustrated in Fig. 13: vertical group pulses; vertical file pulses; and reset pulses. The vertical file, vertical group, and reset pulses are supplied to each of the control circuits 900–09. The vertical group pulses function to identify a group of subscriber lines and their associated line terminations and the vertical file pulses function to identify the lines and their associated terminations in the group. As in ordinary crossbar telephone systems, the subscriber lines are arbitrarily arranged in vertical groups and vertical files. Such crossbar telephone systems are described, for example, in the above-identified patent granted to A. J. Busch. The subscriber lines 3L00–49 and the line terminations 11L00–49 are subdivided into ten vertical groups, each of which includes five vertical files. Each of the vertical group pulses supplied from the register 1201 selects a group of five line terminations connected respectively to each of the expanders 800–09. The vertical group pulse is supplied in parallel to the ten circuits 900–09 so that it functions to select five times ten or fifty subscriber line terminations. Between two such vertical group pulses the register 1201 supplies five vertical file pulses to the circuits 900–09. One subscriber line termination, connected to each of the expanders 800–09 or ten in all, is scanned by each vertical file pulse. In order to scan the 500 line terminations, the register 1201 provides to each of the ten circuits 900–09, ten 15-volt vertical group pulses spaced at intervals of 24 milliseconds and five 15-volt vertical file pulses spaced at intervals of 4 milliseconds between each pair of vertical group pulses. As shown in Fig. 13, the vertical file and vertical group pulses are respectively 4 and 24 millisecond pulses and the complete scanning cycle has a duration of 240 milliseconds.

In addition to the vertical group and vertical file pulses, the circuit 1201 supplies one reset pulse at the beginning of the cycle to insure the synchronous operation of the line concentrator and concentrator control circuit scanning cycles with that of the call register cycle. The reset pulse also functions as the first vertical group pulse so that only nine vertical group pulses are provided instead of ten during a single cycle.

To recapitulate, during one scanning cycle the circuit 1201 supplies one reset pulse, nine vertical group pulses and fifty vertical file pulses. One vertical file pulse is provided for each of the fifty line terminations 11L00–49.

As described above, the register 1201 includes two ring counters 12VF and 12VG. A ring counter is one having a number of bistable stages connected in a ring only one of which is enabled at a time. Each input pulse to a ring counter sets the enabled stage which in turn enables the next stage in the chain and which resets the preceding stage in the chain. The counter 12VF is a six-stage counter with its sixth stage enabling the operation of its first stage, and the counter 12VG is a ten-stage counter with its tenth stage enabling the operation of its first stage. The count pulses from the pulse divider 12PD through the gate 12RH1 are provided to the input terminal C of the six-stage ring counter 12VF. At each sixth pulse from the divider 12PD, or at each cyclic operation of the counter 12VF, a pulse is provided from an output terminal 5 of the counter 12VF to the input terminal C of the ten-stage counter 12VG. In other words, the counter 12VG advances one step for each operating cycle of the counter 12VF. The counter 12VF has six output terminals 0–5 and the counter 12VG has ten output terminals 0–9.

When the counters 12VF and 12VG are stepped respectively to their last stages 5 and 9, a path is enabled from the output terminal 0 of the counter 12VF through two enabling gates, 12C4 and 12C3, two OR gates 12RS2 and 12RS1 and an amplifier 12RS to the reset terminals R of the counters 12VF and 12VG. The gates 12C4 and 12C3 are enabled because their control terminals C are connected, respectively, to the output terminals 5 and 9 of the counters 12VF and 12VG. The output terminal 5 of the counter 12VF is connected through a delay circuit 12DL to the control terminal C of the gate 12C4. The gate 12C4 therefore remains enabled as the counter 12VF steps to its stage 0. The pulse from terminal 0 of the counter 12VF therefore passes through the enabled gates 12C4 and 12C3 and the OR gates 12RS2 and 12RS1 to the amplifier 12RS.

The reset pulse from the amplifier 12RS at terminals R of the counters 12VF and 12VG functions to reset the counter 12VG to its first stage and to insure that the counter 12VF is set at its first stage. As is hereinafter described, the reset pulse is also supplied to the line concentrators 300–09 to insure their synchronization with the register 1201. The reset pulse, the vertical file pulses provided at terminals 0–4 of the counter 12VF and the vertical group pulses provided at terminals 0–9 of the counter 12VG are referred to as scanning pulses.

When the counters 12VF and 12VG ready the path for the reset pulse from stage 0 of the counter 12VF, they also block a count pulse from the generator 1200 to a lead 12L1. The count pulses from the pulse divider 12PD, which are supplied to the counter 12VF as described above, are normally also supplied through the parallel circuit arrangement consisting of the inhibiting gates 12C1 and 12C2 and the lead 12L1 to the ten control circuits 900–09. As long as either of the gates 12C1 and 12C2 is normal remaining enabled, the count pulses are provided to the circuits 900–09. The control terminals C of the gates 12C1 and 12C2 are connected, respectively, to the terminals 5 and 9 of the counters 12VF and 12VG so that a count pulse is blocked when a reset pulse is provided from the amplifier 12RS.

With either of the gates 12C1 and 12C2 normal, the count pulses are provided through lead 12L1 to the ten control circuits 900–09. In each of the ten control circuits 900–09, the count pulses are provided from lead 12L1 through an inhibiting gate 9SR4 to an amplifier 9C in a signaling circuit 9S9. The amplifier 9C provides an inhibiting pulse to a receiving amplifier 9SRA in the signaling circuit 9S9. A signaling circuit of this type is described in detail in M. E. Krom Patent 2,921,139, issued January 12, 1960. The amplifier 9C supplies the count pulses through a transformer 9T1, the control pair 6CP1 and a transformer 6T1 in the line concentrator 300 to the amplifier 6C. The amplifier 6C, which is part of a signaling circuit 609 in the line concentrator 300, supplies the count pulses through an inhibiting gate 6S and a lead 6L3 to the input terminal C of a six-stage ring counter 3VF. The counter 3VF together with a ten-stage counter 5VG form a combined arrangement similar to the one in the register 1201 described above. At each sixth count pulse to the counter 3VF, a pulse is provided from its output terminal 5 to the input terminal of the counter 5VG. The counter 5VG steps once therefor for each cyclic operation of the counter 3VF.

In each of the concentrators 301–09 as well as in the concentrator 300, the count pulses similarly function to cyclically drive two ring counters 3VF and 5VG which are similar to the counters 3VF and 5VG in the concentrator 300.

When the ring counter 12VF provides an output pulse at its terminal 5 and the ring counter 12VG provides an output pulse at its terminal 9, the next count pulse from the pulse generator 1200 does not pass through the register 1201 to the circuits 900–9. As described above, when the counters 12VF and 12VG reach the count of 60, the gates 12C1 and 12C2 are inhibited to block the passage of the next count pulse. At the same time that the count pulse is blocked the gates 12C3 and 12C4 are enabled to provide a reset pulse, which as described above, resets the counters 12VF and 12VG. The reset pulse through the gates 12C3 and 12C4 is also provided through the OR gate 12RS2, an OR gate 12RS3, an inhibiting gate 9SR6 and an amplifier 9R to the primary winding of the transformer 6T1. The reset pulse is coupled through the transformer 6T1 and supplied over the control path 6CP1 to the transformer 6T1 in the signaling circuit 609. Since the reset pulses are provided in parallel from the register 1201 to each of the ten concentrator control circuits 900–9, the reset pulses are supplied in parallel to each of the concentrators 300–09. In each of the concentrators 300–09, the reset pulse is coupled through the transformer 6T1 and an amplifier 6R to the reset terminals of a number of components. More specifically, the reset pulse is provided to the reset terminal R of a trunk selector counter 6TKS, the reset terminal R of flip-flop circuits 6BCA, 6BCB and 6TC, through an OR gate 603 to the reset terminal R of a flip-flop circuit 6D and to the reset terminals R of the ring counters 3VF and 5VB. The reset pulse functions therefore to synchronize the counters 3VF and 5VG with the counters 12VF and 12VG in the register 1201 and to insure that the concentrator 300 is normal. The reset pulses therefore function both as synchronizing pulses and as normalizing pulses for the concentrators 300–09.

Under control of the count and reset pulses from the register 1201 in the central office, the ten sets of counters 3VF and 5VG in the concentrators 300–09 are stepped through a 60-pulse cycle. The ten sets of counters 3VF and 5VG and the counters 12VF and 12VG in the register 1201 are cyclically and synchronously operated as long as a terminating or an originating call to any of the lines 3L00–09 is not initiated.

The counters 3VF and 5VG are driven by the pulses from the central office to cyclically scan the fifty lines 3L00–49 connected to the concentrator 300. As described above, the lines 3L00–49 are arbitrarily arranged in groups designated vertical groups and vertical files. Each of the vertical groups includes five vertical files so that there are ten vertical groups in all for identifying the fifty lines 3L00–49. The pulses supplied from the output terminals 0–4 of the counter 3VF and from the output terminals 0–9 of the counter 5VG are utilized to scan the fifty lines 3L00–49. The vertical group output pulses function to select the vertical group and the vertical file output pulses function to select the vertical file in the selected group.

When an output or step potential is provided on one of the terminals 0–9 of the group counter 5VG, it operates an associated one of ten group transistors 5QG0–9. The transistors 5QG0–9 are NPN junction transistors having their base electrodes connected respectively through the base resistors 5R20–29 to terminals 0–9 of the counter 5VG, their emitter electrodes connected to the voltage regulator 5VR and their collector electrodes connected respectively through the resistors 5R10–15 and the varistors 5V0–9 to the emitter electrodes of the fifty transistors 3QL00–49. The junction between the resistors 5R10–19 and the varistors 5V0–9 are connected respectively through the resistors 5R0–9 and also through the capacitors 5C0–9 to ground. Each of the group transistors 5QG0–9 is multipled to five of the fifty line or gate transistors 3QL00–49. For example, the collector electrode of transistor 5QG0 is connected through the resistor 5R10 and the varistor 5V0 to the emitter electrodes of the five line transistors 3QL00–04. The fifty transistors 3QL00–49 are associated individually with the fifty lines 3L00–49, with lines 3L00–04 and their associated transistors 3QL00–04 being in vertical group zero.

The scanning circuitry utilized in the illustrative embodiment of this invention is described in detail in my Patent 2,921,140, issued January 12, 1960.

As described above, the emitter electrodes of the ten transistors 5QG0–9 are multipled to the voltage regulator 5VR. The voltage regulator 5VR is a low impedance source of reference voltage which is utilized for regulating the sensitivity of the transistor gates including respectively the NPN junction transistors 3QL00–49. The regulator 5VR includes a PNP junction transistor 5QR having its collector electrode connected to a minus 24-volt potential source 5B2, its base electrode connected to a center tap of a potentiometer 5POT and its emitter electrode connected to the emitter electrodes of the transistors 5QG0–9. The emitter electrode of the transistor 5QR is also connected to ground through the capacitor 5C10 and the resistor 5R30.

The potential supplied by the voltage regulator 5VR is less negative than the minus 24-volt source 5B2 as controlled by the adjustment of the potentiometer 5POT which has one end terminal connected to ground and the other to the source 5B2. More specifically, the output potential supplied by the regulator 5VR is determined by the voltage across the emitter-collector junction of the transistor 5QR which is serially connected with resistor 5R30 between ground and the source 5B2. The conduction through the emitter-collector path is controlled by the emitter-to-base potential which is in turn controlled by the setting of the potentiometer 5POT. As is hereinafter described, the more negative the potential supplied by the regulator 5VR, the more sensitive are the transistors 3QL00–49 to potential changes across lines 3L00–49. The potentiometer 5POT is set to provide a relatively negative regulator output when the line concentrator 300 is located near the central office.

Assume by way of example that the potential provided by the voltage regulator 5VR is minus 18 volts. The emitter electrodes of the transistors 5QG0–9 are therefore at the minus 18-volt regulator potential. The base-to-emitter junction of only one of the transistors 5QG0–9 is forward biased at any time since the normal potential at the leads 0–9 of the ring counter 5VG is minus 24 volts. The step potential cyclically provided at the output terminals 0–9 is minus 8 volts so that the transistors 5QG0–9 are successively saturated. When, for example, a step potential is provided at terminal 0 of the counter 5VG, the transistor 5QG0 becomes conductive. The impedance between the collector electrode and the emitter electrode of the transistors 5QG0–9 is high and when the associated stage of the ring counter 5VG is off and is essentially a short circuit when the associated stage is on. The current path through the collector and emitter electrodes of the transistor 5QG0 is from ground through the resistors 5R0 and 5R10 and the collector and emitter electrodes of the transistor 5QG0 to the regulator 5VR. When the transistor 5QG0 is saturated, the potential supplied to the transistors 3QL00–04 is approximately two-thirds the voltage supplied from the voltage regulator 5VR due to the voltage divider effect of resistors 5R0 and 5R10. With a regulator voltage of minus 18 volts, a minus 12-volt potential is provided to the emitter electrode of each of the five transistors 3QL00–04. The potential normally provided to the emitter electrodes of the transistors 3QL00–04 is ground potential due to the connection of the emitter electrodes through the varistor 5V0 and the resistor 5R0 to ground.

When the transistor 5QG0 is saturated, the potential at the emitter electrodes of the transistors 3QL00–04 changes from ground potential to the minus 12-volt potential which is equal to two-thirds the potential supplied from the regulator 5VR. The minus 12-volt potential at the emitter electrodes of the transistors 3QL00–04 is insufficient to initiate conduction because the emitter-base junctions of transistors 3QL00–04 are normally reverse biased, respectively, by a minus 24-volt potential from sources 3B0–4. The base electrodes of the 50 transistors 3QL00–49 are connected respectively through resistors 3R00–49 and resistors 3R100–49 to the minus 24-volt potential sources 3B0–49. The resistors 3R00–49 are also connected respectively through normal contacts of relays 3C00–49 to the ring leads of the lines 3L00–49.

Assuming that the line 3L00 is idle with the receiver on-hook, the resistance between the tip and the ring leads of the line 3L00 will be large and the potential at the base electrode of transistor 3QL00 will be minus 24 volts. The tip leads of the lines 3L00–49 are connected respectively through normal contacts of the relays 3C00–49 and the resistors 3R50–99 to ground. When the line 3L00 is idle, the base potential is determined by the battery 3B0. The resistors 3R50–99 function to protect the contacts of the relays 3L00–49 from excessive currents due to foreign potentials, and capacitors 3C50–99, connected respectively between the base electrodes of transistors 3QL00–49 and ground, serve to reduce the effects of alternating-current interference and to absorb transient surges due to lightning, etc. The varistors 5V0–9 function to protect the emitter junctions of the line transistors 3L00–49 against breakdown due to excessive reverse bias. The emitter junctions are normally reverse biased by 24 volts and have a breakdown potential of approximately 40 volts. The varistors 5V0–9 provide an additional protection as their breakdown potentials are also appriximately 40 volts. Since the emitter electrode of transistor 3QL00 is at minus 12 volts which is more positive than the minus 24-volt potential at the base electrode, conduction through the transistor 3QL00 is inhibited and the emitter-collector junction impedance is high.

The transistor gate including the transistor 3QL00 is, in this manner, disabled when the associated line 3L00 is idle so that a pulse to the collector electrode of transistor 3QL00 is inhibited. The pulses, which are supplied to the collector electrodes of the transistors 3QL00–49, are vertical file step pulses supplied from the ring counter 3VF respectively through the primary windings of the five transformers 3SRT0–4 and the capacitors 3CA0–49. The secondaries of the transformers 3SRT0–4 are connected between ground and an OR circuit 3SRT which is connected to a service request amplifier 6SR. If a vertical file pulse from the counter 3VF can pass through the primary winding of the associated one of the transformers 3SRT0–4, the induced pulse functions as a service request indication. A pulse is allowed to pass through the primary winding of one of the transformers 3SRT0–4 only when one of the line transistors 3QL00–49 connected thereto is saturated. Each of the transformers 3SRT0–4 is connected to ten of the transistors 3QL00–49 and if any one of these ten transistors is saturated when the vertical file pulse is supplied, a service request indication is recognized. The identity of the line which initiates the service request is determined by its time position in the scanning cycle. The transistor 3QL00 is one of the ten transistors 3QL (00, 05, 10, 15, etc.) in vertical file 0 which are connected to the transformer 3SRT0. With line 3L00 idle, the positive vertical file pulse from terminal 0 of the counter 3VF is blocked at the transistor 3QL00. The absence of a service request pulse indicates that line 3L00 is idle.

As long as there are no service requests from any of the ten sets of fifty subscriber lines 3L00–49, or a terminating call thereto, the ten sets of counters, one in each of the line concentrators 300–09, synchronously step through the count of 60, with a reset pulse being supplied at the beginning of each cycle to insure synchronization.

In the universal line concentrator described herein, the service request may be initiated from either the line concentrators 300–09 or at the central office. A service request is initiated at one of the line concentrators 300–09 responsive to the request of the subscriber for service and a service request is initiated at the central office responsive to the appearance of a terminating call to one of the line concentrator subscriber lines. A terminating call is initiated when one of the line terminations 11L00–49 is seized having its sleeve potential changed from minus 48 volts to ground potential. The central office includes in each of the concentrator control circuits 900–09 a diode scanner instead of a transistor scanner of the type described above in the line concentrators 300–09. A diode scanner may be utilized because problems of line leakage, range, showering, etc. are not present except at the line concentrators 300–09. As the vertical file counter 12VF operates, pulses appear at its five output terminals 0–4 which are successively provided to groups of ten of the capacitors 9CS0–49. Each of the capacitors 9CS0–49 together with a varistor 9DS0–49 forms a scanning arrangement individual to each of the line terminations 11L00–49. The junction between each of the capacitors 9CS0–49 and each of the varistors 9DS0–49 is connected, respectively, through resistors 9R50–99 and the normal contacts of the hold magnets 8L00–49 in the trunk switch 800 to the sleeve leads of the line terminations 11L00–49. When one of the line terminations 11L00–49 is seized to initiate a terminating call, the potential on its sleeve lead changes from minus 48 volts to ground potential to relatively forward bias the associated one of the varistors 9DS0–49 in the control circuit 900. The varistors 9DS0–49 are normally reversed biased due to their connection, respectively, through the resistors 9R50–99 and the resistors 9R0–49 to the negative potential sources 9B0–49. The diodes or varistors 9DS0–49 form part of a first diode arrangement through which the vertical file pulse passes before it functions as a service request pulse. The second diode arangement, which includes ten varistors 9DG0–9, is controlled by the vertical group ring counter 12VG.

As the group counter 12VG is operated, it provides pulses successively from its output terminals 0–9 through ten resistors 9G0–9 to the varistors 9DG0–9. The varistors 9DG0–9, which are normally reverse biased, are successively forward biased by the counter 12VG. In order to provide a service request pulse a combination of both a grounded sleeve lead and forward biasing of the associated one of the varistors 9DG0–9 is required in order to pass a vertical file pulse through to become a service request pulse. The vertical file pulse is provided for the line termination 11L00, for example, through the capacitor 9CS0, the varistor 9DS00, the capacitor 9CA0, the varistor 9DG0, an OR gate 9SRS and an inhibiting gate 9L0 to the input terminal S of a flip-flop circuit 9SRF. The identity of the line requesting service is indicated as to location in the concentrated group of lines by the state of the group and file counters 12VG and 12VF at the moment the service request pulse is received at the circuit 9SRF. As is hereinafter described, when the circuit 9SRF operates, it halts the cyclic operation of the counters 12VG and 12VF causing them to stop at the identity of the service requesting line or line termination.

If all ten sets of lines 3L00–49 and all ten sets of line terminations 11L00–49 remain idle, the scanning sequence continues under control of the count pulses from the generator 1200. In all, as described above, there are eleven sets of counters, ten respectively in the line concentrators 300–09 and one in the register 1201, which are synchronously operated. If all ten sets of lines 3L00–49 and line terminations 11L00–49 remain idle, the scanning sequence continues under control of the three sets of pulses; the vertical group, the vertical file and the reset pulses.

During each scanning cycle of the line concentrators 300–9 are checked to determine if they are in synchronism with the call register 1201 in the central office. In the remote line concentrator a gate 5CK is enabled when the counter 5VG provides an output potential at its terminal 9. A pulse is provided through the enabled gate 5CK from the output terminal 4 of the counter 3VF. In this manner, after the line 3L49 is scanned, the next count pulse is provided through the enabled gate 5CK, an OR gate 6CT, an amplifier 6CTA, the transformer 6T1 and the control pair 6CP1 to the central office. The check pulse does not interfere in any way with the scanning operation for determining the service condition of the line 3L49 because the amplifier 6CTA provides for a slight delay.

In the central office the check pulse is provided from the control pair 6CP1 through the transformer 9T1, an amplifier 9CT, an inhibiting gate 9SR3 to the set terminal of a flip-flop circuit 9CK1 and to the reset terminal R of a flip-flop circuit 9CK2. At substantially the same time that a pulse is produced through the gate 5CK1 a pulse is produced in the register 1201 through an enabled gate 12CK1. The control terminal of the gate 12CK1 is connected to the output terminal 9 of the counter 12VG, and the pulse through the gate 12CK1 is provided from the output terminal 4 of the counter 12VF. The check pulse from the call register 1201 is provided through the gate 12CK1 and an inhibiting gate 9SR2 to the set terminal S of the flip-flop circuit 9CK2. The counters 3VF and 5VG in the concentrator 300 follow the counters 12VF and 12VG in the register 1201 by an interval of time determined by the velocity of propagation through the cables 6CP1 and 6CP2. The check pulse arrives from the concentrator 300 at the circuits 9CK1–2 appreciably later, 4 milliseconds, than the check pulse from the call register 1201. The check pulse from the call register 1201 sets the flip-flop circuit 9CT2 and the check pulse from the concentrator 300 resets the circuit 9CK2 and also sets the circuit 9CK1.

The circuit 9CK1 is reset by the reset pulse from the call register 1201 as the reset terminal R of the circuit 9CK1 is connected to the OR gate 12RS3 in the reset path from the register 1201. In this manner the pulse through the gate 12CK1 and the reset pulse bracket the check pulse from the line concentrator 300. If the check pulse fails to appear in the proper time slot from the line concentrator 300, the circuits 9CK1 and 9CK2 detect it and provide an operating potential through an OR circuit 9CK to operate the alarm relay 9ALM. The winding of the alarm relay 9ALM is connected between the battery 9B54 and the OR circuit 9CK. The alarm relay 9ALM does not operate if the check pulse arrives from the concentrator 300 because it has an operating time greater than 8 milliseconds which is the time that either the circuits 9CK1 and 9CK2 remain normally set.

*Service request*

A service request pulse is provided to one of ten service request flip-flop circuits 9SRF in the concentrator control circuits 900–9 when a call is originated at any one of the lines 3L00–49 connected to the ten concentrators 300–9 or when a terminating call is initiated to any one of the ten sets of lines 3L00–49 by grounding the sleeve lead of its associated line termination 11L00–49.

When a call is initiated at one of the substations 3S00–49 connected to the concentrator 300, the vertical file pulse from the ring counter 3VF in the concentrator 300 is transformed to a service request pulse and supplied to the amplifier 6SR. For example, if the line 3L00 is in a service request condition with the receiver off-hook, the resistance across the tip and ring leads of the line 3L00 is relatively low so that the base electrode of the transistor 3QL00 is near ground potential. The resistors 3R100 and 3R50 function together with the line impedance as a voltage divider to determine the potential at the base electrode of transistor 3QL00. The potential at the base electrode changes to a value near ground potential when the line 3L00 assumes the service request condition because the resistance of the resistor 3R100 is much larger than that of the resistor 3R50. With the base electrode of transistor 3QL00 near ground potential and the emitter electrode of transistor 3QL00 at minus 12 volts due to the operation of the transistor 5QG0, the emitter-base junction is forward biased to allow base current to pass through the transistor 3QL00. With base current through the transistor 3QL00, the impedance between its collector and emitter electrodes becomes very small. When the first stage of the ring counter 3VF is thereafter operated or turned on, a pulse is supplied from terminal 0 of the counter 3VF through the primary winding of transformer 3SRT0, capacitor 3CA0, the collector-to-emitter path of transistor 3QL00, varistor 5V0 and resistor 5R0, shunted by capacitor 5C0, to ground. The pulse through the primary winding of the transformer 3SRT0 induces a pulse in the secondary winding of the transformer 3SRT0 which is supplied through the OR circuit 3SRT to the amplifier 6SR.

The pulse amplified by the service request amplifier 6SR is provided through the transformer 6T1 and the control pair 6CP1 to the transformer 9T1 in the central office concentrator control circuit 900. The induced pulse is provided from the primary winding of transformer 9T1 through the receiving amplifier 9SRA, the OR circuit or gate 9SRS, the inhibiting gate 9L0 to the input terminal of the flip-flop circuit 9SRF. As briefly described above, the other input to the OR circuit 9SRS receives service requests initiated at the line terminations 11L00–49 so that either the lines 3L00–49 or the line terminations 11L00–49 can initiate service request pulses to the circuit 9SRS.

The inhibiting gate 9L0 allows the passage of a service request pulse as long as an idle one of the trunks 5T0–9 is available for the originating or terminating connection. As is hereinafter described, each of the lines 3L00–49 is connectable to only a combination of six trunks of the ten trunks 5T0–9 and the line terminations 11L00–49 are connectable to these same trunks. Fig. 14 illustrates the possible connections to the trunks 5T0–9. For example, the lines 3L00–04 and the line terminations 11L00–04 in vertical group 0 can be connected only through the trunks 5T0–3, 5T8 and 5T9. A connection cannot be provided through any of the trunks 5T4–7. If all six trunks, which are connectable to the calling or called line, are busy, the service request pulse is not recognized at the concentrator control circuit 900 and the circuit 9SRF is not operated.

If all six trunks available for the vertical group 0 are busy, and AND gate 8GA0 in the trunk switch 800 is enabled to provide a positive potential through a resistor 8R30 to the base electrode of a transistor 8TR0. The switch 800 includes ten AND gates 8GA0–9 and ten transistors 8TR0–9 which are associated respectively with the ten vertical groups 0–9. Each of the AND gates 8GA0 has six input terminals which are connected respectively to six of the horizontals of a crossbar switch in the line expander or trunk switch 800. The ten horizontals are connected to the ten trunks 5T0–9. If, for example, the trunk 5T0 is busy, it is connected through one of the crosspoints in the top horizontal of the crossbar switch to one of the line terminations 11L00–49. Suppose, for example, that trunk 5T0 is busy because it is connected to the line 11L00. A connection is then provided from one of the input terminals of the AND gate 8GA0 through the operated crosspoint connected to trunk 5T0 and operated contact of a hold magnet 8L00 to the sleeve lead of the line termination 11L00 which is at ground potential for the busy condition. The input terminal of the gate 8GA0 is normally at a negative potential due to its connection through a resistor 8R40 to a negative battery 8B60. With the crosspoint operated, however, a relatively positive potential is provided to the AND gate 8GA0.

If all six input terminals are at the positive potential to indicate that all six trunks are busy, the AND gate 8GA0 is enabled to energize the transistor 8TR0. The emitter terminals of the transistors 8TR0–9 are connected respectively to the negative batteries 8B100–9 and the collector electrodes of the transistors 8TR0–9 are connected respectively to the grounded windings of ten group busy relays 8GB0–9.

When the transistor 8TR0 is energized, it operates the relay 8BG0 to inhibit the gate 9L0. Relay 8BG0 closes a control path from the terminal 0 of the counter 12VG to the OR gate 9RRS. When an output potential is provided at terminal 0 of the counter 12VG, it is provided through the gate 9RRS to the control terminal C of the gate 9L0. The terminals 1–9 of the counter 12VG are connected through contacts of relays 8BG1–9 to the gate 9RRS. When the gate 9L0 is inhibited, it blocks service requests. In this manner as long as all trunks for the vertical group 0 are busy, service requests therefrom are not recognized. During the time, therefore, that the lines 3L00–04 and the line terminations 11L00–04 connected respectively to the concentrator 300 and line expander 800 are scanned, the gate 9L00 is inhibited to block service requests. In effect, the vertical group 0 is omitted in the scanned cycle as service requests therefrom are not recognized.

For incoming or terminating calls a connection is provided to trip ringing and to provide busy tone back to the calling subscriber if all trunks are busy. Suppose, for example, that a call is initiated to line 3L00 and all the trunks in the vertical group 0 are busy. For such a condition a connection is provided from the tip lead of the line termination 11L00 through a normal contact of the hold magnet 8L00 and operated contact of the group busy relay 8GB0 to one side of a neon tube 8RT0. A connection is also provided from the ring lead of the termination 11L00 through another normal contact of the hold magnet 8L00 and another operated contact of the group busy relay 8GB0 to the other side of the neon tube 8RT0. The neon tube 8RT0 is also connected on one side to a grounded capacitor 8CT0 and on the other side through a capacitor 8CB0 to the grounded secondary of a transformer 8LB. The primary of the transformer 8LB is connected to a busy tone supply 8BT. The neon tube 8RT0 is energized when a connection is completed between the tip and ring leads of the line termination 11L00 due to the initiation of the terminating call. When the neon tube 8RT0 is energized the external ringing to the termination 11L00 is tripped and busy tone from the source 8BT is supplied through the tip and ring leads of the line termination 11L00 back to the calling subscriber.

Returning now to the sequence of operations for establishing a connection between line 3L00 and the termination 11L00, assume the relay 8BG0 is normal to indicate available trunks. With relay 8BG0 normal, the gate 9L0 remains enabled and the service request pulse sets the circuit 9SRF.

The flip-flop circuit 9SRF is a bistable circuit. A positive pulse applied to the input terminal S of circuit 9SRF triggers the circuit from one state to the other and leaves it there until a reset pulse at either of its terminals R or MR triggers it back again to its former state. When the flip-flop circuit 9SRF is normal, or off, its output terminal 0 is relatively negative and when it is set its output potential is relatively positive.

The flip-flop circuit 9SRF, which is part of the concentrator control circuit 900, is individually associated with the concentrator 300 and switch 800. The line concentrator system also includes nine other flip-flop circuits 9SRF, two of which are shown, which are in the circuits 901–09 and therefore individually associated with the nine concentrators 301–09 and also with the nine switches 801–09. The operation of the circuit 9SRF provides an indication, therefore, of the identity of the concentrator-expander pair which made the service request.

When the flip-flop circuit 9SRF in the circuit 900 is set, it performs the following functions:
 (1) It operates a relay 9SR associated therewith;
 (2) It provides a reset pulse through the varistor 9V9 to the reset terminals R of the flip-flop circuits 9SRF in the control circuits 901–9;
 (3) It blocks the gate 9L0 in each of the circuits 900–9;
 (4) It sets a flip-flop circuit 12RHF; and
 (5) It enables a gate 9SR1 and it also inhibits the inhibiting gates 9SR2–3.

The relay 9SR is operated as its winding is connected between the output terminal 0 of the flip-flop circuit 9SRF and the negative potential source 9B50. When relay 9SR operates, it operates a relay 8C0 in the trunk switch 800, it enables gates 9SR5, 9SR7 and 9SR8 and it inhibits gates 9SR4 and 9SR6 by extending a control path from the output terminal 0 of the circuit 9SRF through an operated contact of relay 9SR to the control terminals thereof. The control terminals of the gates 9SR1–3 are directly connected to the output terminal 0 of the circuit 9SRA. The inhibition of gates 9SR4 and 9SR6 blocks the transmisson of the count and reset pulses from the register 1201 to the line concentrator 300. The gates 9SR1, 5, 7 and 8 ready the circuit 900 for an outpulsing sequence utilized in setting up a talking connection.

As tabulated above, when the circuit 9SRF in the control circuit 900 is set, it supplies a reset pulse to the circuits 9SRF in the circuits 901–9. The reset pulse is provided to prevent the seizure of two of the circuits 900–9 responsive to the simultaneous arrival of two service requests. The lowest designated one of the circuits 900–9 is preferred. For example, if service requests are simultaneously provided to the control circuits 900 and 904, the service request to the circuit 900 is preferred. The reset pulse or potential from the output terminal 0 of the circuit 9SRF in the circuit 900 is provided through a varistor 9V9 to the reset terminal R of the circuit 9SRF in the circuit 901 and through a serial connection of a varistor 9V8 in each of the circuits 901–8 to the reset terminals R of the circuits 9SRF in the circuits 902–9. The varistors 9V8 in the circuits 901–9 block the reset pulse to the lower numbered control circuits 900–8 to effectively establish the preference.

When any one of the circuits 9SRF operates, the gates 9L0 in the request paths of the circuits 900–9 are inhibited. The output terminals 0 of the flip-flop circuits 9SRF are multipled through varistors 9V7 to one input terminal of the OR gates 9RRS in the circuits 900–9. Subsequent service is therefore not recognized.

As also tabulated above, when any one of the ten circuits 9SRF operates, it in turn provides an operating potential through a varistor 9V10 to a flip-flop circuit 12RHF0 in the common control circuit 1100. The circuit 1100, which includes the register 1201 and the generator 1200, is common to all ten control circuits 900–909. When the circuit 12RHF0 is set, it operates an associated relay 12RH, it provides an inhibiting potential to the gate 12RH1 and it provides an enabling potential to a gate 12RH2. With the gate 12RH1 inhibited, count pulses from the pulse generator 1200 to the register 1201 are blocked. The eleven sets of ring counters, one in the register 1201 and the other ten, respectively, in the line concentrators 300–9 are accordingly stopped at the identity of the calling line 3L00. Counters 12VF and 12VG in the register 1201 are stopped at their first stages assuming that line 3L00 is requesting service to register, respectively, the vertical file number and the vertical group number of the calling line 3L00. The sequence for registering the line identity is similar for both an originating and a terminating call because both function to set the flip-flop circuits 9SRF and 12RHF0.

When the relay 12RH operates responsive to the operation of the circuit 12RHF0, it functions to close operating paths from battery 12B3 to the windings of relays 12VF0–4 and 12VG0–9. The windings of the relays 12VF0–4 are connected, respectively, to the output terminals 0–4 of the ring counter 12VF and the windings of the relays 12VG0–9 are connected, respectively, to the output terminals 0–9 of the ring counter 12VG. With the ring counters 12VF and 12VG stopped to identify the line 3L00, an operating potential is provided for the relays 12VF0 and 12VG0. In other words, when relay 12RH operates, it in turn causes the operation of the relays 12VF0 and 12VG0. In addition to operating relays 12VF0 and 12VG0, the relay 12RH also functions to provide a pulse through an OR gates 12XPC, the now enabled gate 9SR8, a transmitting amplifier 9XPC in the signaling circuit 9S9, to the primary of the transformer 9T2. The other end of the primary is connected through the resistor 9RA9 to the battery 9BA. The pulse is coupled through the transformer 9T2 and the control pair 6CP2 to the transformer 6T2 in the line concentrator 300. The secondary of the transformer 6T2, which is connected through resistor 6R1 to battery 6B1, provides the pulse through an amplifier 6XPC and an enabling gate 606 to the set terminal S of a flip-flop circuit 6BCA.

The circuit 6BCA has two operating conditions which correspond respectively to the "on" and "off" conditions described above for the flip-flop circuits in the central office. A control potential is provided at its terminal 0 when it is set and at its terminal 1 when it is reset. When the circuit 6BCA is set, it removes the enabling potential from the control terminal of the gate 606 and it provides a control potential to the control terminal of a gate 607 so that the next pulse from the amplifier 6XPC would function to reset circuit 6BCA. The gate 607 is also connected to the reset path from the amplifier 6R to the circuit 6BCA. With the flip-flop circuit 6BCA set, and another flip-flop circuit 6BCB reset, an AND gate 610 is energized and an AND gate 600 is deenergized. With the gate 610 energized and the gate 600 deenergized, an enabling gate 6S remains disabled and an enabling gate 6TK is enabled so that any count pulses from the receiving amplifier 6C are routed to a trunk select counter 6TKS instead of to the counters 3VF and 5VG. The control potential for the gate 6TK is provided from the terminals 1 and 0, respectively, of the circuits 6BCA and 6BCB through the AND gate 610. The two circuits 6BCA and 6BCB provide for a combination of four operating conditions of the line concentrator 300. For each combination one of the four AND gates 600, 601, 610 and 611 is enabled.

With the line concentrator 300 set to receive pulses at the counter 6TKS, a trunk selection sequence is initiated at the central office trunk selector 1101 to select one of the trunks 5T0–9 which interconnect the concentrator 300 with the trunk switch 800. The trunk selection sequence is initiated at the same time that the control pulse is provided to set the circuit 6BCA which is when the relay 12RH is operated. When relay 12RH operates, it provides a control potential to the enabling gate 11TS in the selector 1101 allowing the passage of pulses at a rate of 500 pulses per second from the pulse generator 1200 to ten enabling gates 11A0–9 in the selector 1101. The gates 11A0–9 are associated individually with ten bistable stages or flip-flop circuits 11TK0–9 which are arranged as a ring counter. The control potential which is provided to control terminal C of the gate 11TS also functions to set the first stage 11TK0. When the stage 11TK0 is set, it enables the gate 11A0, it provides a reset pulse to the reset terminal R of the stage 11TK9, and it provides a pulse through a differentiating network 11DF, the enabled gate 9SR5, the transmitting amplifier 9C, the transformer 9T1 and the control pair 6CP1 to the line concentrator 300.

The differentiating network includes ten capacitors 11CA0–9 which are respectively connected between the output terminals 0–9 of the stages 11TK0–9 and ten grounded resistors 11D0–9. The capacitors 11CA0–9 are also connected respectively to ten varistors 11V0–9 which are multipled to a grounded resistor 11DN and to the gate 9SR5 which is part of the trunk pulse path to the line concentrator 300.

In the line concentrator 300, the trunk count pulse is coupled through the transformer 6T1, the amplifier 6C and the gate 6TK to the count or input terminal C of the counter 6TKS and through an inhibiting gate 6TCG to the input terminal S of a flip-flop circuit 6TC. The counter 6TKS is normal with all stages reset before the first pulse is provided thereto. The first pulse sets the circuit 6TC which functions to set the first stage of the counter 6TKS. The first pulse, therefore, to the count terminal C of the counter 6TKS does not perform a step function as all the gates therein, not shown, are disabled. When the circuit 6TC is set by the first pulse, it also provides a control potential to disable the gate 6TCG to block the passage of subsequent count pulses to the circuit 6TC.

In the trunk selector 1101, the pulses through the gate 11TS cause stages 11TK0–9 to successively operate with a pulse being provided on each step to the line concentrator 300. The stages 11TK0–9 have associated therewith, respectively, gates 11B0–9 and the gates 11C0–9 in addition to the gates 11A0–9. The gates 11B0–9 and 11C0–9 are controlled by the trunk switch 800 in accordance with the availability of trunks 5T0–9. The gates 11C0–9 are normally disabled and the gates 11B0–9 are normally enabled due to the connection, respectively, of their control terminals C to ten grounded resistors 11BC0–9. The gates 11B0–9 and 11C0–9, which are controlled respectively in accordance with the condition of ten trunks 5T0–9, are at their normal conditions when the associated trunks are idle. An idle trunk will inhibit the associated one of the gates 11B0–9 and enable the associated one of the gates 11C0–9. As briefly described above, a relay 8C0 in the trunk switch 800 is operated when the service request is received at the control circuit 900. The winding of relay 8C0 is connected between battery 8B70 and a grounded contact of relay 9SR. When relay 8C0 operates, as is hereinafter described, the availability of trunks 5T0–9 is provided to the selector 1101. When one of the gates 11B0–9 is inhibited to indicate an available trunk, it stops the stepping sequence of the trunk selector 1101, and when one of the gates 11C0–9 is enabled pulses through the gate 11TS are supplied through an OR gate 11S0 to a select flip-flop circuit 11SEL. When the circuit 11SEL operates, it indicates that the trunk selection is complete.

The stepping sequence is halted when one of the gates

11B0–9 is disabled because they are located in the set paths for the stages 11TK1–9. For example, the set potential for the stage 11TK1 is provided from the terminal 0 of the stage 11TK0 through the serially connected enabled gates 11A0 and 11B0. If the gate 11B0 is disabled, the stage 11TK1 is not set.

Each stage, as it is set, provides a reset pulse to its preceding stage. If the stage 11TK1 becomes set, it functions to reset the stage 11TK0 as its terminal 0 is connected to the terminal R of the stage 11TK0. If the gate 11B0 is disabled, however, the stage 11TK1 is not set and the stage 11TK0 is not reset. The stepping sequence is therefore stopped.

For each step in the selector 1101 a pulse is provided through the network 11DF, the control circuit 900 and the control pair 6CP1 to the trunk counter 6TKS in the line concentrator 300. The counter 6TKS is therefore set at the same stage as the selector 1101 when the trunk outpulsing is halted. In this manner trunk outpulsing and trunk selection are concurrent. A separate or subsequent outpulsing sequence is unnecessary.

As described above, the trunk selection sequence commences upon the operation of the relay 12RH which also operates the relays 12VF0 and 12VG0. When the group relay 12VG0 operates, it closes a number of control paths from the trunk switch 800 to the control terminals C of the gates 11B0–9 and 11C0–9.

The trunk switch 800 includes the 10 by 50 crossbar switch, described above, which functions to connect the ten trunks 5T0–9 from the concentrator 300 to the fifty terminations 11L00–49 connected to the switch 800. When one of the trunks 5T0–9 is busy, a relatively positive control potential is provided to the trunk selector 1101. More specifically, if one of the trunks is busy, the switch 800 functions to extend a connection to the selector 1101 from the sleeve lead of the line termination to which it is connected. As described above, the sleeve leads of any of the terminations 11L00–49 are at ground potential when they are being utilized and at a minus 48-volt potential when they are idle.

Suppose that trunk 5T0 is busy being utilized for a connection between the line 3L49 and the line termination 11L49. The ground potential at the sleeve lead of the termination 11L49 is provided through an operated contact of the hold magnet 8L49, an operated crosspoint in the top horizontal of the crossbar switch, an operated contact of the relay 8C0, lead L0, an operated contact of the relay 12VG0 to the resistor 11BC0 and the control terminals C of the gates 11B0 and 11C0. The switch 800 has fifty hold magnets 8L00–49 which are associated individually with the line terminations 11L00–49 and ten select magnets 8T0–9 which are individually associated with the trunks 5T0–9. As is hereinafter described, one of the hold magnets 8L00–49 and one of the select magnets 8T0–9 are operated when a connection is established through the switch 800.

As described above, not all of the trunks 5T0–9 are available for connection to any one of the lines 3L00–49 because they are connected on a slip multiple basis of the type disclosed in the above-identified disclosure by Joel-Krom-Posin. Only six of the trunks are available for connection to any one of the lines 3L00–49 and there is a different six for the lines in each vertical group. Fig. 14 illustrates the available trunks for each vertical group. The six trunks available to a group are referred to as a trunk multiple. For example, the trunk multiple connectable for the lines 3L00–04 in the vertical group 0 includes trunks 5T0, 5T1, 5T2, 5T3, 5T8 and 5T9. In other words for the call originated at line 3L00, an idle one of the trunks 5T0–3, 5T8 and 5T9 is selected. Trunks 5T8 and 5T9 are common to all ten multiples.

If a trunk is in the trunk multiple for the service requesting vertical group and it is idle, a control potential is provided to disable one of the gates 11B0–9. The control potential is connected by the relay 12VG0 with the trunk 5T0 controlling gate 11B0, trunk 5T1, gate 11B1, etc.

For the vertical group 0, if all of the trunks 5T0–3, 5T8 and 5T9 are idle, the gates 11B0–3, 11B8 and 11B9 are disabled. The gates 11B4–7 remain enabled as a control potential is not provided thereto. If any one of the trunks 5T0–3, 5T8 and 5T9 is busy, its associated gate is enabled.

The trunk selector 1101 provides for a random selection by connecting the control potentials to the gates 11B0–9 after the stepping operation has commenced. The group relay 12VG0 is operated responsive to the operation of the relay 12RH so that there is an interval between the stepping operation of the selector 1101 and closure of the test leads L0–9 from the trunk switch 800 to the selector 1101. As described above, the selector 1101 is arranged to hunt over open test leads because of the ground resistors 11BC0–9 so that the actual trunk selection commences at an interval after the operation of relay 12RH. This interval depends on the operating times of the group relays 12VG0–9 so that a random first choice of the selection of the trunks 5T0–5 is obtained.

All the idle trunks in the trunk multiple connectable to the calling line 3L00 are considered for selection by the trunk selector 1101 even though they may initially skip over due to the random delay interval. Suppose, for example, that trunks 5T8 and 5T9 in the trunk multiple connectable to the calling line 3L00 are busy and trunks 5T1–3 are idle. Also assume that relay 12VG0 does not operate to disable the gates 11B0–3 until after the trunk selector 1101 has advanced past the stage 11TK3. The stepping sequence continues then from stage 11TK3 to stage 11TK9. Since the stages 11TK0–9 are connected in a ring circuit arrangement, the stage 11TK9 enables the gate 11A9 to ready an operating path for the stage 11TK0. The next pulse through the enabling gate 11TS is provided through the gates 11A9 and 11B9 to set the stage 11TK0. In this manner the trunk selector 1101 operates until the inhibited one of the gates 11B0–9 is encountered. The trunk selector 1101 can function in this manner because it was previously determined that an idle trunk in the multiple connectable to the calling line 3L00 is idle or available for connection thereto. This was determined when the service request was received at the flip-flop circuit 9SRS in the concentrator control circuit 900. If all the trunks in the trunk multiple were busy the gate 9L0 would be inhibited, as described above, to block the service request. If the service request is received and trunk selection initiated, it indicates that there is an idle trunk in the trunk multiple connectable to the calling line 3L00. It is because of the trunk availability determination, that trunk outpulsing may be simultaneous with trunk selecting.

As described above, when relay 12RH operates, it causes the operation of the relays 12VF0 and 12VG0 in the register 1201. When the relays 12VF0 and 12VG0 are operated, they in turn cause the operation of a relay 11CD in the trunk selector 1101. The operating path for the relay 11CD is extended from the winding of the hold magnet 8L00 which is associated with the calling line 3L00. More specifically, the operating path for relay 11CD is from ground, through an operated contact of relay 12RH, the winding of relay 11CD, a normal contact of a relay 12C0, the serially connected operated contacts of the relays 12VF0, 12VG0 and 8C0 to the winding of the magnet 8L00. The windings of the hold magnets 8L00–49 are connected respectively to the negative potential sources 8B0–49. The relay 11CD therefore operates over a path to the negative potential source 8B0. The connection to the source 8B0 functions as a check of the idle condition of the line 3L00 because if the line 3L00 was busy the hold magnet 8L00 would be operated closing a ground potential to its winding. If a ground potential is present at the winding of the hold magnet 8L00, the relay 11CD does not operate. With the line 3L00, however, in a service request condition or idle, relay 11CD operates. Though the operating path for the relay 11CD is through the winding of the hold magnet 8L00, the hold magnet 8L00 does not operate at this time. The magnet 8L00 does not operate because the winding of the relay 11CD is a high resistance winding so that the potential across the winding of the magnet 8L00 is insufficient for operation.

When the relay 11CD operates, it locks through its operated contact to the negative potential source 11BA6. Relay 11CD is operated before the trunk selection sequence is completed because relay 12VG0, which causes the operation of relay 11CD, also functions to extend the control paths L0–9 to the gates 11B0–9. When relay 11CD operates, it readies an operating path for the relay 12C0 from the output terminal 0 of a flip-flop circuit 12CK.

As described above, when the stepping sequence is completed, the flip-flop circuit 11SEL is set. When the flip-flop circuit 11SEL is set, it operates a relay 11ES, the winding of which is connected between the output terminal 0 of the circuit 11SEL and a battery 11BA4. When the flip-flop circuit 11SEL operates, it also provides a second pulse through the OR gate 12XPC, the enabled gate 9SR8, the transmitting amplifier 9XPC, the transformer 6T2, the control path 6CP2, the transformer 6T2 in the concentrator 300, the receiving amplifier 6XPC and the enabled gate 607 to the reset terminal of the flip-flop circuit 6BCA. As described above, before the second pulse arrives at the line concentrator 300, the circuit 6BCA is set and the circuit 6BCB is reset. The circuit 6BCA is therefore reset to provide a control potential through an enabled gate 604 to the set terminal of the circuit 6BCB. In this manner, the control pulse provided from the flip-flop circuit 11SEL in the trunk selector 1101, the second pulse from the central office to the amplifier 6XPC, functions to reset the circuit 6BCA and to set the circuit 6BCB. With the circuit 6BCA reset and the circuit 6BCB set, the AND gate 601 is energized and the AND gates 600, 610 and 611 are deenergized. When the AND gate 601 is energized, it provides an operating potential to the set terminal of the flip-flop circuit 6D causing it to operate and in turn operate a relay 6DR, the winding of which is conected between the output terminal 0 of the circuit 6D and the negative potential source 6B3. When the relay 6DR operates, it closes a path for the winding of one of the relays 6TK0–9 which are connected respectively to the output terminals 0–9 of the trunk counter 6TKS.

Suppose, for example, that the selected trunk for the calling line 3L00 is trunk 5T9. During the trunk selection sequence ten pulses were sent or outpulsed from the selector 1101 through the circuit 900 and the control pair 6CP1 to set the counter 6TKS at its stage 9. With an operating potential at terminal 9 of the counter 6TKS, relay 6TK9 is operated upon the operation of relay 6DR. The operating path for relay 6TK9 is from the output terminal 9 through the winding of the relay 6TK9, the now operated contact of relay 6DR and a lamp 6L to a negative battery 6B5. When relay 6TK9 operates, it functions to disconnect whatever line was last connected to trunk 5T9.

As is hereinafter described, when a call is ended with the receiver returned to the cradle, the talking connection remains established though an idle indication for both line and trunk is provided at the central office. In other words, though the trunk 5T9 provides for an idle indication to the trunk selector 1101, it remains connected to an idle one of the lines 3L00–49. Suppose, for example, that trunk 5T9 was last utilized for a call to or from line 3L09.

Each of the trunks 5T0–7 is connectable to the lines in five of the vertical groups 0–9 and each of the trunks 5T8–9 is connectable to all ten trunks. Each of the trunks 5T0–7 has associated therewith five trunk file relays and five trunk group relays. The last digit of these relays identifies the file or group and the next-to-last digit identifies the trunk. For example, relay 4TF90 is a trunk file relay for trunk 5T9 and vertical file 0. Fig. 14 provides the information as to which trunk group relays are provided for each trunk. For example, trunk 5T0 is connectable to the lines in groups 0, 1, 3, 5 and 9 so that trunk 5T0 has associated therewith five relays: 4TG00, 4TG01, 4TG03, 4TG05 and 4TG09.

The trunk 5T9 is connectable to all fifty of the lines 3L00–49 so that ten trunk group relays 4TG90–99 are associated therewith. Assuming that the trunk 5T9 was last connected to line 3L09, the relays 4TG91 and 4TF94 are operated. All the trunk group and file relays are magnetically latched relays of the type disclosed in the copending patent application Serial No. 697,465, filed on November 19, 1957, by G. E. Perreault. The magnetically latched relays are operated by a pulse or potential of one polarity, remain operated in the absence of potential or operating current, and are released by a pulse or potential of opposite polarity.

The disconnect sequence for releasing the relays 4TG91, 4TF94 and a cut-off relay 4CO09 is initiated by the operation of the relay 6TK9. At the same time that relay 6TK9 is operated, the disconnect relay 6DR also functions to operate a relay 4D1 which in turn operates the relay 4D2. The winding of the relay 4D1 is connected from ground, an operated contact of relay 6DR to the negative battery 4B2 and the winding of the relay 4D2 is connected from ground through an operated contact of relay 4D1 to the battery 4B2. With relays 4TKA9 and 4D2 operated, operating paths are provided through operated contacts of the mechanically latched relays 4TG91 and 4TF91 for relays 4G1 and 4F4. There are ten relays 4G0–9 and five relays 4F0–4 which function during the disconnect sequence to register the identity of the line to be disconnected. The operating path for the relay 4G1 is from ground through an operated contact of relay 4D1, an operated contact of relay 4TKA9, an operated contact of relay 4TG91 and the winding of relay 4G1 to a negative battery 4B6. Each of the contacts of the relays 4TKA0–9 is multiplied to all the trunk route relays associated therewith and the trunk relays for all the trunks, which have the same group designation, are multiplied to the windings of the relays 4G0–9. Similar connections are provided to the windings of the relays 4F0–4. The operated path for the relay 4F4 is from ground through the operated contact of relay 4D1, an operated contact of the relay 4TKA9, an operated contact of relay 4TF94 and the winding of relay 4F4 to the battery 4B6. When the relays 4G1 and 4F4 operate, they lock to ground through an operated contact of the relay 4TKA9. More specifically, the locking path for relay 4G1 is from ground through an operated contact of relay 4TKA9, an operated contact of relay 4G1 and the winding of relay 4G1 to battery 4B6. The locking path for relay 4F4 is from ground through the operated contact of relay 4TKA9, an operated contact of relay 4F4 and the winding of relay 4F4 to battery 4B6.

The operation of the relays 4F4 and 4G1 in combination with the operated relay 4TKA9 completes a path for applying release current to the trunk or crosspoint relays 4TF94 and 4TG91 and for releasing the line cut-off relay 4CO09. As described above, each of the trunk relays and the cut-off relays are mechanically latched relays which require a release or disconnect operating path providing a potential opposite to the potential causing operation. The operating paths for these relays are hereinafter described. The release path for the relay 4TF94 is from battery 4B1 through a lamp 4L, an operated contact of relay 4D2, the winding of relay 4TF94, an operated contact of relay 4F4, an operated contact of relay 4TKA9, a varistor 4V5 and another operated contact of relay 4D2 to ground. The release path for the relay 4TG91 is from battery 4B1 through the lamp 4L, the operated contact of relay 4D2 and the winding of relay 4TG91, an operated contact of relay 4G1, an operated contact of relay 4TKA9, varistor 4V3 and the operated contact of relay 4D2 to ground. The release path for the relay 4CO09 is also the operating path for a relay 4CK1 as their windings are serially connected. This path is from the battery 4B1 through the operated contact of relay 4D2, the serially connected windings of relays 4CK1 and 4CO09, an operated contact of relay 4G1, an operated contact of relay 4F4, varistor 4V1 and the operated contact of relay 4D2 to ground.

When the relay 4CK1 operates, it provides an indication to the central office that the crosspoints have been opened and that the trunk 5T9 is ready for connection to the calling line 3L00. More specifically, when relay 4CK1 operates, it provides a connection from the grounded resistor 3R151 through an operated contact of relay 4D1, an operated contact of relay 4CK1, an operated contact of relay 4TKA9, an operated contact of relay 4D1, another operated contact of relay 4TKA9 to lead 3L7 which is connected to the OR gate 6CT. The lead 3L7 is normally at a negative potential due to its connection through the resistor 3R152 to the negative battery 3B51. When relay 4CK1 operates, it changes the potential on lead 3L7 from the negative potential due to battery 3B1 towards a ground potential due to the connection through the grounded resistor 3R151.

The check potential is provided from the OR gate 6CT through the transmitting amplifier 6CTA in the signaling circuit 609, the transformer 6T1 and the control pair 6CP1 to the signaling circuit 9S9 in the concentrator control circuit 900. In the signaling circuit 9S9 the check potential is coupled through the transformer 9T1, the amplifier 9TC, the enabled gate 9SR1 and the gate 12CK2 to the set terminal of the flip-flop circuit 12CK as an indication that the disconnect is accomplished at the concentrator 300.

At the same time that the disconnect sequence takes place in the concentrator 300 a sequence takes place at the trunk switch 800 to disconnect the other end of the trunk 5T9 from the line termination 11L09. As described above, the line concentrator disconnect sequence is initiated by the selector 1101 after trunk 5T9 is selected and the circuit 11SEL operated. In addition to supplying the disconnect potential to the concentrator 300, the circuit 11SEL operates the relay 11ES. When relay 11ES operates, it in turn operates a relay 11K9 to register the selected trunk identity, and to initiate the trunk switch disconnect sequence. There are ten relays 11K0-9 which are individually associated with the stages 11TK0-9. For trunk 5T9, the stepping operation ends at the stage 11TK9 so that an operating path is provided for the relay 11K9 from the output terminal B of the stage 11TK9, through the winding of the relay 11K9, an operated contact of relay 11ES, an operated contact of relay 9SR, to the negative potential source 11BA3. When relay 11K9 operates, it shunts down the winding of any one of the hold magnets 8L00-49, which is locked operated to trunk 5T9. More specifically, battery 11BA5 is connected through the normally closed contact of relay 12C0, the operated contact of relay 11ES, the operated contact of 11K9, the operated contact of relay 8C0, to the grounded resistor 8R9. With the line termination 11L09 connected to trunk 5T9 the line hold magnet 8L09 is locked to trunk 5T9 at this time so that the minus 48-volt potential from the source 11BA5 is connected through the operated crosspoint of the trunk swich 800 and the operated contact 8L09 to the winding of the hold magnet 8L09. With minus 48 volts at both sides of the winding of the hold magnet 8L09 it releases. It is necessary to provide a release potential in this manner, as described above, because the connection through the line concentrator 300 remains connected after the subscribers have disconnected.

With the line 3L09 disconnected from the trunk 5T9 at the concentrator 300 and the termination 11L09 disconnected from the trunk 5T9 at the central office, the trunk 5T9 may be connected between the calling line 3L00 and its associated termination 11L00.

As described above, when the disconnect sequence is completed at the concentrator 300, a disconnect check pulse is provided to operate the flip-flop circuit 12CK in the common control circuit 1100. When the circuit 12CK is operated, it provides a control potential to the inhibiting gate 12CK2 to block subsequent pulses from the amplifier 9CT and it enables a gate 12MRS to ready a reset path to the concentrator 300. When the circuit 12CK operates, it also functions to operate the relay 12C0, the winding of which is connected between the battery 12B8, and through an operated contact of relay 11CD to the output terminal 0 of the circuit 12CK. When the relay 12C0 operates, it opens the shunting path to the winding of the magnet 8L09, described above, and it closes an operating path for the select magnet 8T9 in the trunk circuit 800. The operating path for the select magnet 8T9 is from ground through the operated contact 12C0, the operated contact 11K9, the operated contact 8C0 and the winding of the magnet 8T9 to the negative battery 8B59. When the select magnet 8T9 operates, it connects ground through its operated contact, the operated contact of relay 12C0, the operated contact of relay 12VF0, the operated contact of relay 12VG0 and the operated contact of relay 8C0 to the winding of the hold magnet 8L00 causing it to operate. When the magnet 8L00 operates, a connection is established through the trunk switch 800 from the trunk 5T9 to the line termination 11L00.

At the same time that the magnets 8T9 and 8L00 are being operated in the trunk switch 800 to connect the trunk 5T9 to the termination 11L00, a connection is being established in the concentrator 300 from the line 3L00 to the trunk 5T9. When the relay 12C0 in the common control circuit 1100 is operated, it provides a pulse through the gate 12XPC, the amplifier 9XPC and the control path 6CP2 to the concentrator 300. This is the third pulse provided through the control path 6CP2 to the concentrator 300 during the originating call sequence. At the concentrator 300, the pulse is coupled through the transformer 6T2, the amplifier 6XPC and the gate 606 to set the circuit 6BCA. With both of the circuits 6BCA and 6BCB set, the AND gate 611 is energized and the gates 600, 601 and 610 are deenergized. When the gate 611 is energized, it provides a reset pulse through the amplifier 6RS and an OR gate 603 to the reset terminal R of the circuit 6D. When the circuit 6D resets, it releases the relay 6DR and it provides a control potential to energize an AND gate 602. When the AND gate 602 is energized it sets the circuit 6M which in turn operates the relay 6MR. The winding of the relay 6MR is connected between the output terminal 0 of the circuit 6M and a battery 6B2. As is hereinafter described, when the relay 6MR is operated, paths are completed for operating the relays 4M1, 3VF0, 5VG0 and 6TK9. When the relay 6DR releases, it releases the relays 4D1, 6TK9 and 4TKA9. When relay 4D1 releases, it releases relay 4D2 and when relay 4TKA9 releases, it releases relays 4F4 and 4G1. Finally, when relays 4F4 and 4G1 release, they release the relays 4CK1 and 4CO09 so that the line concentrator 300 is normal ready to connect the line 3L00 to the trunk 5T9.

The sequence for establishing the connection is initiated when relay 6MR operates. As described above, relay 6MR is operated upon the reception of the third connect pulse which functioned to return the concentrator to normal.

When relay 6MR operates, it operates relay 4M1 by connecting ground to one side of the winding of relay 4M1, the other side of which is connected to the battery 4B3. Relay 6MR also reoperates relay 6TK9 if it has released. The new operating path for relay 6TK9 is from the terminal 9 of the counter 6TKS through the winding of relay 6TK9, the operated contact of relay 6MR and lamp 6L to battery 6B5.

Relay 6MR operates relays 3VF0 and 5VG0 to register the line identity of the calling line 3L00. The output terminals 0–4 of the counter 3VF are connected to the windings of the relays 3VF0–4 and the output terminals 0–9 of the counter 5VG are connected to the windings of the relays 5VG0–9. With the counters 3VF and 5VG stopped at their stages 0, relays 3VF0 and 5VG0 are operated upon the operation of relay 6MR. The operating path for relay 3VF0 is from terminal 0 of the counter 3VF through the winding of the relay 3VF0, an operated contact of relay 6MR and lamp 5L to battery 5B1. The operating path for relay 5VG0 is from terminal 0 of the counter 5VG through the winding of relay 5VG0, the operated contact of relay 6MR and the lamp 5L to the battery 5B1.

When relays 3VF0 and 3VG0 operate, they in turn operate relays 4F0 and 4G0. The operating path for relay 4F0 is from ground through an operated contact of relay 3VF0 and the winding of relay 4F0 to battery 4B6. The operating path for relay 4G0 is from ground through an operated contact of relay 5VG0 and the winding of relay 4G0 to battery 4B6. When relay 4M1 operates, it completes a path from ground through an operated contact of relay 4M1, an operated contact of the relay 6TK9, to the winding of the relay 4TKA9 which is also connected to the battery 4B4.

When relays 4F0 and 4G0 operate, they in turn operate the relay 4CK1 and the magnetically latched relays 4TG90, 4TF90 and 4CO00. The operating path for relay 4TG00 is from ground through an operated contact of relay 4M1 through the winding of relay 4TG90, an operated contact of relay 4G0, an operated contact of relay 4TKA9, varistor 4V4, another operated contact of relay 4M1 and lamp 4L to battery 4B1. A similar operating path is provided for relay 4TF90 through the serially connected contacts of relays 4M1, 4F0 and 4TKA9 and the varistor 4V6. The operating path for relays 4CK1 and 4CO00 is through the grounded contact of relay 4M1, the serially connected windings of relays 4CK1 and 4CO00, the contacts of relays 4G0 and 4F0, varistor 4V2, the contact of relay 4M1 and lamp 4L to battery 4B1.

When relays 4TG90 and 4TF90 are operated, they connect the line 3L00 through their serially connected contacts to trunk 5T9. When relay 3C00 operates, it disconnects the line scanning circuitry from line 3L00 and when relay 4CK1 operates, it provides a crosspoint closure indication to the central office.

The closure or check indication is provided from the resistor 3R152 through the lead 3L7, the OR gate 6CT, the amplifier 6CTA and the transformer 6T1 to the control path 6CP1. At the central office the pulse is coupled through the transformer 6T1 and the amplifier 9CT, the gate 9SR1 and the gate 12MRS to the amplifier 12MA. The amplifier 12MA is a master reset amplifier which resets all the operated flip-flop circuits in the central office and which provides a reset pulse to the remote line concentrator 300. It functions to reset the concentrator 300 except for the established connections and to resume normal scanning.

The pulse from the amplifier 12MA is supplied through the OR gate 12RS1 and the amplifier 12RS to the reset terminals of the ring counters 12VF and 12VG returning them to their first stages. The amplifier 12MA also provides a reset pulse to the reset terminal R of the circuit 12CK, to the reset terminal R of the circuit 12RHF0, to the reset terminal MR of the circuit 9SRF, and to the reset terminals CR of the circuits 11TK1–9. The amplifier 12MA also provides a set potential to the input terminal S of the circuit 12RRS causing it to set and provides an inhibiting potential through the OR gate 9RRS to the inhibiting gate 9L0. As is hereinafter described, the flip-flop circuit 12RRS remains set for a random interval under control of the oscillator 12OSC to inhibit the recognition of service requests. A random inhibition interval after normal scanning is resumed is in this manner provided.

The amplifier 12MA also provides a reset pulse through the OR gate 12RS3, the gate 9SR6, the amplifier 9R, the transformer 9T1 and the control pair 9CP1 to the line concentrator 300. In the line concentrator 300 the reset pulse is coupled through the transformer 6T1 and the amplifier 6R to the reset terminals of the counter 6TKS and the flip-flop circuits 6BCA and 6BCB returning them to normal. When the circuits 6BCA and 6BCB are reset, they together enable the AND gate 600 which enables the gate 6S. The gate 6S readies a path for the count pulses from the central office through the amplifier 6C to the ring counter 3BF. The reset pulse from the amplifier 6R is also provided to the reset terminals of the flip-flop circuits 6TC, 6M and the counters 3VF and 5VG in each of concentrators 200–9 returning them to normal. When the circuit 6TC is reset it enables the gate 6TCG and when the circuit 6M is reset it releases the relay 6MR associated therewith. When the relay 6MR releases, it in turn releases the relays 4M1 and 6TK9. The relay 6TK9 may have been released when the trunk counter 6TKS is reset. When the relay 4M1 releases, it opens the operating path for the relays 4TG90 and 4TF90 which remain latched operated and from the relays 4CK1 and 4CO00. The relay 4CK1 releases but the cut-off relay 4CO00 remains latched operated. When the relay 4TKA9 releases, it in turn releases the relays 4G0 and 4F0 returning them to normal. When the relay 6MR released it also functioned to release the relays 3VF0 and 3VG0.

In this manner the line concentrator 300 is returned to normal with the connection from line 3L00 remaining established through the relays 4TG90 and 4TF90 to the trunk 5T9. The cut-off relay 4CO00 also remains operated to disconnect the transistor scanner from the line 3L00. In the central office a similar sequence takes place as all the circuits are returned to normal except that the connection remains established from the trunk 5T9 to the line termination 11L00 under control of the ground potential externally applied to the sleeve lead of the line termination 11L00. When scanning is resumed, a service request condition cannot be detected at line 3L00 as long as it remains connected to the trunk 5T9. The talking connection remains established even when the call is discontinued. Thereafter, if the trunk 5T9 is required for a service request from another one of the lines, it is disconnected from the line 3L00 in a manner described above. If it is not disconnected and another call is initiated from the line 3L00, the line concentrator equipment is not involved in serving the call as at the central office the tip lead of the line termination 11L00 becomes connected to the ring lead of the line termination 11L00 through the established connection to initiate the service request. In other words, as far as the external telephone equipment, not shown, is concerned, the service request is originated directly at the line termination 11L00 as soon as the receiver is lifted off-hook at the substation 3S00. The line concentrator equipment functions to connect a trunk to a service requesting line as long as one is not already connected thereto.

When the circuit 12RHF0 is reset, it enables the gate 12RH1 to restart the scanning sequence. The normal scanning sequence is thereupon resumed though service requests are not recognized for a random interval under control of the oscillator 12OSC. As described above, the circuit 12RRS provides a control potential to the gate 9L0 in the service request path for a random interval under control of the oscillator 12OSC. The oscillator 12OSC resets the circuit 12RRS a random interval up to 250 milliseconds after scanning is resumed.

The reset pulse from the amplifier 12MA is also provided as a synchronizing pulse to an oscillator 12OSC1 which has an operating cycle of 2 pulses per second. The pulse from the amplifier 12MA is provided through the gate 12RS1, the amplifier 12RS, the gate 12RS2, and an OR gate 12RS4 to the oscillator 12OSC1. If a reset pulse is not provided to synchronize the oscillator 12OSC1 within one-half second after relay 12RH is operated, the oscillator 12OSC1 functions to release the line concentrator system and resume scanning. When the circuit 12RHF0 sets, it inhibits the gate 12RH2 and when relay 12RH is operated it enables a gate 12RH4 and it provides a synchronizing potential through the gate 12RS4 to the oscillator 12OSC1. The output of the oscillator 12OSC1 is provided through the inhibiting gate 12RH2 to the OR gate 12RS1 which is part of the reset path described above. The oscillator 12OSC1 functions therefore as a safety device in the event a connection is not established during the one-half second interval following the service request.

It is to be understood that the above-described arrangements are illustrative of the application of the principles of this invention. Numerous other arrangements may be devised by those skilled in the art without departing from the spirit and scope of the invention. For example, the number of lines, line terminations, trunks and line concentrators may be either more or less than as described in the illustrative embodiment. Moreover, the scanning and outpulsing speeds may be changed, the trunk multipling may be changed, etc. In fact, the concentrator system may be used in any system such as telemetering systems, radio systems, etc. where a connection is to be established between two associated sets of terminals. It is evident, therefore, that the described arrangement is merely illustrative.

What is claimed is:

1. In a telephone system a plurality of lines, a central office, a plurality of trunks extending from said central office, a switching network interconnecting said lines and said trunks, means responsive to the initiation of a service request condition at any one of said lines for providing an indication of the service request to said central office, means at said central office for recognizing said indication, means at said central office effective upon the operation of said recognizing means for selecting one of said trunks for connection to said service requesting line, and means at said central office controlled in accordance with the condition of said trunks for inhibiting the operation of said recognizing means when all of said trunks connectable to said service requesting line are busy.

2. In a telephone system a plurality of lines, a central office, a plurality of trunks extending from the central office, switching means for connecting any one of said lines to any one of a combination of said trunks, means at said central office for recognizing a call to any one of said lines, a trunk selector effective upon the recognition by said recognizing means of a call to one of said lines for selecting an idle one of said trunks of said combination of trunks connectable by said switching means to said called line, means at said central office for inhibiting the operation of said recognizing means for calls to said called line as long as all of said trunks of said combination of trunks connectable to said called line are busy, and means controlled by said trunk selector for operating said switching means to connect said called line to said selected trunk.

3. A line concentrator system comprising a central station, a plurality of lines, a plurality of trunks extending from said central station and less in number than said plurality of lines, a line concentrator for establishing connections between said lines and said trunks, means at said central station effective after the initiation of a call from any one of said lines for selecting an idle one of said trunks, means for preventing operation of said selecting means if none of said trunks is idle, and means at said central station for outpulsing the identity of said selected trunk to said concentrator simultaneously with the selection thereof by said selecting means.

4. A line concentrator system in accordance with claim 3 wherein said selecting means includes a ring counter having a plurality of stages connected in a chain, means for initiating the successive operation of said stages, means for supplying inhibiting potentials to said stages to indicate idle conditions of said trunks, and means for supplying to said outpulsing means one pulse as each of said successively operated stages operates.

5. A line concentrator system in accordance with claim 3 wherein said concentrator includes a switching network connecting said lines with said trunks, and a trunk counter controlled by said central office outpulsing means for controlling the operation of said switching network.

6. A line concentrator system in accordance with claim 4 wherein said selecting means includes delay means for inhibiting the operation of said inhibiting supply means whereby the idle ones of said trunks are selected on a random basis.

7. A line concentrator system in accordance with claim 5 wherein said selecting means includes a counter having a number of stages associated individually with each of said trunks, means for successively operating some of said stages to select an idle one of said trunks, and means for supplying a pulse to said outpulsing means as each of said successively operated stages is operated whereby said concentrator counter is synchronously operated with said counter in said selecting means.

8. In a telephone system a plurality of lines, a central office, a plurality of trunks extending from the central office, switching means for connecting any one of said lines to any one of a combination of said trunks, means at said central office for recognizing a call to any one of said lines, a trunk selector effective upon the recognition of a call to one of said lines for selecting one of said trunks of said combination of trunks connectable by said switching means to said called line, means at said central office for inhibiting the operation of said recognizing means for calls to said called line as long as all of said trunks of said combination of trunks connectable to said called line are busy, means at said central office for outpulsing the identity of said selected trunk to said switching means during the operation of said trunk selector, and means controlled by said outpulsing means for operating said switching means to connect said selected trunk to said called line.

9. In a telephone system a plurality of lines, a central office, a plurality of trunks extending from the central office, switching means for connecting any one of said lines to any one of a combination of said trunks, means at said central office for recognizing a call to any one of said lines, a trunk selector effective upon the recognition of a call to one of said lines for selecting one of said trunks of said combination of trunks connectable by said switching means to said called line, means at said central office for inhibiting the operation of said recognizing means for calls to said called line as long as all of said trunks of said combination of trunks connectable to said called line are busy, a busy tone supply, means for readying a path for returning busy tone from said supply for calls to said called line as long as all of said trunks of said combination of trunks connectable to said called line are busy, and means controlled by said readying means for completing said busy tone path upon the initiation of a call to said called line.

10. A switching system comprising two sets of individually associated terminals, each of said terminals having a normal and a service request condition, a plurality of links less in number than the number of said terminals in either of said sets, each of said links having an idle and a busy condition, a switching network associated with each of said sets for establishing connections between said links and said terminals in said set, means for recognizing a change in condition at any one of said terminals in either of said sets, means responsive to the recognition of a service request condition by said recognizing means for selecting an idle one of said links, means controlled by said selecting means for operating said switching networks to establish a connection from said service requesting terminal through said selected link to said terminal associated with said service requesting terminal, and means controlled in accordance with the conditions of said links for inhibiting the said recognizing means from recognizing service requests from said terminals for which all connectable links are busy.

11. A line concentrator comprising a plurality of lines; a central office; means for establishing connections between said lines and said central office including a service request detector for recognizing the initiation of a service request at any one of said lines, and a plurality of paths to said central office for each of said lines; and means controlled in accordance with the availability of said paths for inhibiting said detector from recognizing service requests from said lines for which all paths are unavailable.

12. A line concentrator comprising a plurality of lines; a central office; means for establishing connections between said lines and said central office including a service request detector for recognizing the initiation of a service request at any one of said lines, and a plurality of paths to said central office for each of said lines; means controlled in accordance with the availability of said paths for inhibiting said detector from recognizing service requests from said lines for which all paths are unavailable; and means controlled in accordance with the availability of said paths for returning busy tone on calls to said lines for which all of said paths are busy.

13. A universal line concentrator comprising a remote switching unit, a plurality of lines terminating at said remote unit, a central switching unit, a plurality of line terminations individually associated with said lines and terminating at said central unit, a plurality of trunks less in number than said plurality of lines connecting said remote unit to said central unit, means associated with said remote unit for cyclically scanning said lines to determine their service conditions, means associated with said central unit for synchronously scanning said line terminations with said lines, means controlled by either said remote scanning means or said central scanning means for selecting an idle one of said trunks, means controlled by said selecting means for operating said remote unit and said central unit to connect one of said lines through said selected trunk to the associated one of said line terminations, and means for disconnecting said selected trunk at both said remote unit and said central unit when it is subsequently selected by said selecting means for another call.

14. A line concentrator comprising a plurality of lines; a central office; means for establishing connections between said lines and said office including a service request detector for recognizing a service request at any one of said lines, a plurality of paths to said office available to each of said lines, each of said paths having an idle and a busy condition and means controlled by said detector for selecting an idle one of said paths; means controlled in accordance with the conditions of said paths for inhibiting said detector from recognizing service requests from said lines for which all available paths are busy; and means for maintaining a connection established by said connection establishing means through said selected path until said selected path is selected by said selecting means responsive to a subsequent service request.

15. A line concentrator telephone system comprising a plurality of subscriber lines, a plurality of trunks, a scanning unit for each of said lines, means for supplying a series of pulses for successively readying groups of said scanning units, means for successively supplying scanning pulses to different groups of said scanning units wherein each includes one of said readied scanning units, each of said scanning units including means responsive upon the application of a scanning pulse thereto for providing respectively an idle and a service request indication in accordance with the condition of the associated one of said lines, switching means operative upon the reception of a service request indication from one of said scanning units for establishing a talking connection through one of said trunks to said associated line, and means controlled in accordance with the condition of said trunks for preventing the reception of a service request indication when all of said trunks are busy.

16. In a switching system, two sets of individually associated terminals, each of said terminals having two different electrical conditions, a plurality of switching devices interconnecting said two sets of terminals to form a plurality of possible paths from each of said terminals in one of said sets to the associated one of said terminals in the other of said sets, means responsive to a change in condition of one of said terminals in one of said sets for selecting one of said possible paths, means effective after the operation of said selecting means for establishing a connection between said changed condition terminal and its associated terminal in the other one of said sets, and means for inhibiting the operation of said selecting means when all of said possible paths from said changed condition terminal are busy.

17. A universal line concentrator comprising a central office, a line concentrator located at a distance from said central office, a plurality of subscriber lines terminating at said line concentrator, a line expander at said central office, a plurality of line terminations connected to said line expander and individually associated with said subscriber lines, a plurality of trunks connected between said line concentrator and said line expander, means for scanning said lines and said line terminations to detect service requests initiated thereat, means at said central office effective upon the detection of a service request at any one of said lines by said scanning means for halting the operation of said scanning means, means in said central office effective when said scanning means is halted for selecting an idle one of said trunks, means at said central office and controlled by said selecting means for operating said line concentrator and said line expander to establish a talking connection between said calling line and said line termination associated with said calling line, and means for inhibiting the operation of said detection means during the time said scanning means scans lines for which none of said trunks is available.

18. A line concentrator system in which a number of subscriber lines are connected by a line concentrator to a smaller number of trunks extending from a central office comprising switching means at said concentrator providing access from each of said lines to a combination of said trunks, means at said central office for determining the identity of said trunks accessible to any one of said lines, means at said central office for recognizing a service request initiated at any one of said lines, and means at said central office jointly controlled by said determining means and said recognizing means for making a random selection of an idle one of said trunks in said combination to which said service requesting line has access.

19. A line concentrator system in which a number of subscriber lines are connected by a line concentrator to a smaller number of trunks extending from a central office comprising switching means at said concentrator providing access from each of said lines to a combination of said trunks, means at said central office for determining the identity of said trunks accessible to any one of said lines, means at said central office for recognizing a service request initiated at any one of said lines, means at said central office jointly controlled by said determining means and said recognizing means for making a random selection of an idle one of said trunks in said combination to which said service requesting line has access, and means at said central office controlled by said determining means for inhibiting the operation of said recognizing means for each of said lines for which all of said trunks accessible thereto are busy.

20. A universal line concentrator comprising a central office, a line concentrator located at a distance from said central office, a plurality of subscriber lines terminating at said line concentrator, a line expander at said central office, a plurality of line terminations connected to said line expander and individually associated with said subscriber lines, a plurality of concentrator trunks less in number than said plurality of lines connected between said line concentrator and said line expander, means for scanning said lines and said line terminations to detect service requests initiated thereat, means at said central office effective upon the detection of a service request at any one of said lines by said scanning means for halting the operation of said scanning means, means in said line concentrator effective when said scanning system is halted for registering the identity of said service requesting line, means in said central office effective when said scanning means is halted for registering the identity of said service requesting line, means in said central office effective when said scanning means is halted for randomly selecting an idle one of said trunks, means effective during the operation of said selecting means for outpulsing the identity of said selected trunk to said line concentrator, switching means in said line concentrator controlled by said concentrator register means and effective upon the reception of said outpulsed trunk identity for connecting said calling line to said selected trunk, means controlled by said selecting means for supplying an indication of the trunk selection to said line expander, switching means in said line expander controlled by said central office register means and effective upon the reception of said trunk selection indication for connecting said selected trunk to said line termination associated with said calling line, and means in said central office for maintaining the continuous operation of said scanning means as long as all of said trunks are busy.

References Cited in the file of this patent

UNITED STATES PATENTS

| 2,724,744 | Brewer et al. | Nov. 22, 1955 |
| 2,774,822 | Dunlap et al. | Dec. 18, 1956 |
| 2,806,088 | Joel et al. | Sept. 10, 1957 |